US012798259B2

(12) United States Patent
Nakazawa

(10) Patent No.: US 12,798,259 B2
(45) Date of Patent: Nov. 17, 2026

(54) PRINTING DEVICE INCLUDING PRINT HEAD HAVING FIRST NOZZLE FOR EJECTING DROPLETS CONTAINING COLOR COMPONENT AND SECOND NOZZLE FOR EJECTING DROPLETS THAT CHANGE COLORING BY COLOR COMPONENT

(71) Applicant: SEIKO EPSON CORPORATION, Tokyo (JP)

(72) Inventor: Yuki Nakazawa, Minamiarupusu (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 18/676,593

(22) Filed: May 29, 2024

(65) Prior Publication Data

US 2024/0399758 A1 Dec. 5, 2024

(30) Foreign Application Priority Data

May 31, 2023 (JP) ................................ 2023-089837

(51) Int. Cl.

*B41J 2/21* (2006.01)
*B41J 11/00* (2006.01)
*B41M 3/00* (2006.01)

(52) U.S. Cl.

CPC .......... *B41J 2/2135* (2013.01); *B41J 11/009* (2013.01); *B41M 3/008* (2013.01)

(58) Field of Classification Search

CPC ...... B41J 2/2135; B41J 11/009; B41J 29/393; B41J 2/2114; B41J 2029/3935; B41M 3/008

See application file for complete search history.

(56) References Cited

U.S. PATENT DOCUMENTS 6,007,174 A * 12/1999 Hirabayashi ......... B41J 2/04581 347/14
2016/0075146 A1* 3/2016 Akiyama ............... B41J 2/2142 347/15
2023/0074359 A1* 3/2023 Yazawa ................ B41J 11/0015

FOREIGN PATENT DOCUMENTS

JP 2016-221834 A 12/2016

* cited by examiner

*Primary Examiner* — Bradley W Thies
(74) *Attorney, Agent, or Firm* — Spencer Fane LLP

(57) ABSTRACT

A plurality of nozzles of a print head include a first nozzle capable of ejecting first droplets containing a color component and a second nozzle capable of ejecting second droplets for changing the coloring by the color component. A control section is capable of executing control to form a test pattern including an ejection region of first droplets on a medium and, of controlling ejection of the second droplets so that the recording density of second droplets in a first region, which corresponds to the test pattern, becomes a first recording density and, in a second region excluding the first region in the ejection range, becomes a second recording density that is higher than 0%, that is higher than the recording density of second droplets ejected to a second medium into which the droplets permeate more easily, and that is lower than the first recording density.

5 Claims, 13 Drawing Sheets

MEDIUM CORRESPONDENCE TABLE TA1

| MEDIUM DESIGNATION INFORMATION IN1 | PRINTING TARGET |
|---|---|
| FILM | ME1 |
| COATED PAPER | ME1 |
| PLAIN PAPER | ME2 |
| WOOD-FREE PAPER | ME2 |
| TEXTURED PAPER | ME2 |
| ..... | ..... |

FIG. 8

PRINTING DEVICE INCLUDING PRINT HEAD HAVING FIRST NOZZLE FOR EJECTING DROPLETS CONTAINING COLOR COMPONENT AND SECOND NOZZLE FOR EJECTING DROPLETS THAT CHANGE COLORING BY COLOR COMPONENT

The present application is based on, and claims priority from JP Application Serial Number 2023-089837, filed May 31, 2023, the disclosure of which is hereby incorporated by reference herein in its entirety.

BACKGROUND

1. Technical Field

The present disclosure relates to a printing device capable of ejecting droplets containing a color component and droplets that change the coloring by the color component, and a test pattern forming method.

2. Related Art

As a printing device, there is known an ink jet printer in which clear ink droplets and ink droplets containing a color component are deposited on top of each other on a printing medium. For example, when the clear ink is a treatment liquid for aggregating pigment components, the pigment components rapidly aggregate and remain on the surface of the printing medium when the clear ink and the colored ink are mixed.

When a plurality of types of ink droplets are to be deposited on top of each other on a printing medium, it is necessary to adjust the landing positions of the plurality of types of ink droplets. In order to acquire the landing position of an ink droplet from a nozzle array, a test pattern for each type of ink droplet is formed on a print medium. Since the clear ink does not contain a color component, it is not easy to grasp the landing position of the clear ink droplet from the test pattern, even if the test pattern is formed on the printing medium only by clear ink. It is conceivable to make the position of the test pattern easier to understand by ejecting ink droplets containing a color component in a wider range than the test pattern of the clear ink droplets on the printing medium.

For reference, JP-A-2016-221834 discloses a color ink jet recording apparatus in which a patch pattern for adjusting the deposition position of transparent ink for gloss control is formed on a base pattern of colored ink. The color ink jet recording apparatus is provided with a reflection sensor for detecting the specular reflected light of the pattern. The color ink jet recording apparatus acquires information relating to the difference in smoothness between the patch pattern and the region around the patch pattern using the detected signal intensity and, in accordance with this information, decides whether or not to adopt an adjustment amount based on the patch pattern of the transparent ink. The adjustment amount based on the patch pattern of the transparent ink is adopted when the recording medium is glossy paper, and is not adopted when the recording medium is plain paper.

In the case where the clear ink changes the coloring by the color component, the test pattern can be clearly read by forming a test pattern of clear ink droplets in the ejection range of the ink droplets containing the color component onto a printing medium such as plain paper, into which the ink easily permeates. However, it has been found that a test pattern cannot be clearly read when the test pattern of clear ink droplets is formed in the ejection range of ink droplets containing a color component on a printing medium such as film or coated paper, into which ink tends not to permeate.

In the above-described color ink jet recording apparatus, only the gloss of the base pattern of the colored ink is changed by the transparent ink, and readability of the test pattern formed on the printing medium into which ink tends not to permeate cannot be improved.

SUMMARY

A printing device according to the present disclosure is an aspect of a printing device for printing on a medium selected from a plurality of mediums including a first medium and a second medium into which droplets permeate more easily than into the first medium and includes a print head having a plurality of nozzles including a first nozzle configured to eject, onto the medium, first droplets containing a color component and a second nozzle configured to eject, onto the medium, second droplets that change the coloring by the color component and a control section that controls ejection of the first droplets and of the second droplets from the print head, wherein the control section is configured to execute control for forming, on the medium, a test pattern for acquiring at least one of a landing position and a landing state of the second droplets from the second nozzle, the test pattern being included in an ejection range of the first droplets and, when causing to form the test pattern, control ejection of second droplets from the second nozzle so that a recording density of second droplets in a first region corresponding to the test pattern becomes a first recording density and so that a recording density of second droplets ejected onto the first medium in a second region excluding the first region of the ejection range becomes a second recording density that is higher than 0% and that is lower than the first recording density.

A test pattern forming method of the present disclosure is an aspect of a test pattern forming method for a printing device for printing on a medium selected from a plurality of mediums including a first medium and a second medium into which liquid droplets permeate more easily than into the first medium, the printing device including print head having a plurality of nozzles including a first nozzle configured to eject, onto the medium, first droplets containing a color component and a second nozzle configured to eject, onto the medium, second droplets that change the coloring by the color component, and being configured to form, on the medium, a test pattern for acquiring at least one of a landing position and a landing state of the second droplets from the second nozzle, the test pattern being included in an ejection range of the first droplets, the test pattern forming method including a second droplet ejection step of ejecting second droplets from the second nozzle so that a recording density of second droplets in a first region corresponding to the test pattern becomes a first recording density and so that a recording density of second droplets ejected onto the first medium in a second region of the ejection range, the second range excluding the first region, becomes a second recording density that is higher than 0% and that is lower than the first recording density and a first droplet ejection step of ejecting first droplets from the first nozzle onto the ejection range.

BRIEF DESCRIPTION OF THE DRAWINGS

FIG. 8 is a diagram schematically showing an example configuration of a medium correspondence table.

DESCRIPTION OF EMBODIMENTS

Figure 1:
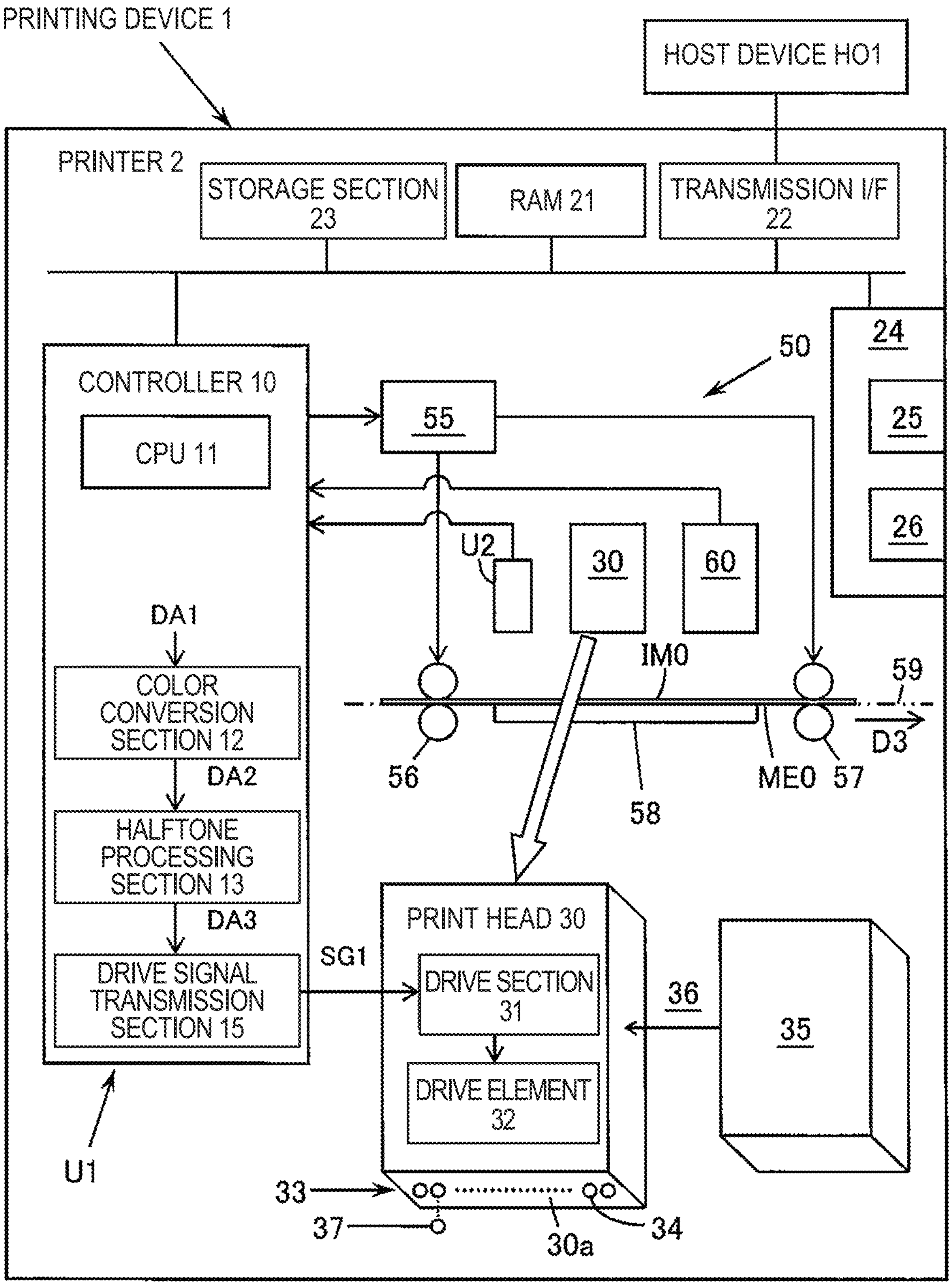
FIG. 1 is a diagram schematically showing an example of a printing device.

Embodiments of the present disclosure will be described below. Of course, the following embodiments are merely illustrative of the present disclosure, and not all of the features shown in the embodiments are essential for the disclosed solution.

(1) OVERVIEW OF TECHNOLOGY INCLUDED IN THE PRESENT DISCLOSURE

First, a summary of the technology included in the present disclosure will be described with reference to the examples shown in FIGS. 1 to 13. Note that the figures of the present application are diagrams schematically showing examples, and the scale of each part may be different from the actual scale in order to make each part of these figures recognizable, and the magnification ratio in the directions shown in these figures may be different, and the figures may not be consistent. Of course, each element of the present technology is not limited to specific examples indicated by reference numerals. In the "Overview of technology included in the present disclosure", terms in parentheses mean a supplementary explanation of the immediately preceding term.

In the present application, the numerical range "Min to Max" means equal to or greater than the minimum value Min and equal to or less than the maximum value Max.

First Aspect

Figure 3:
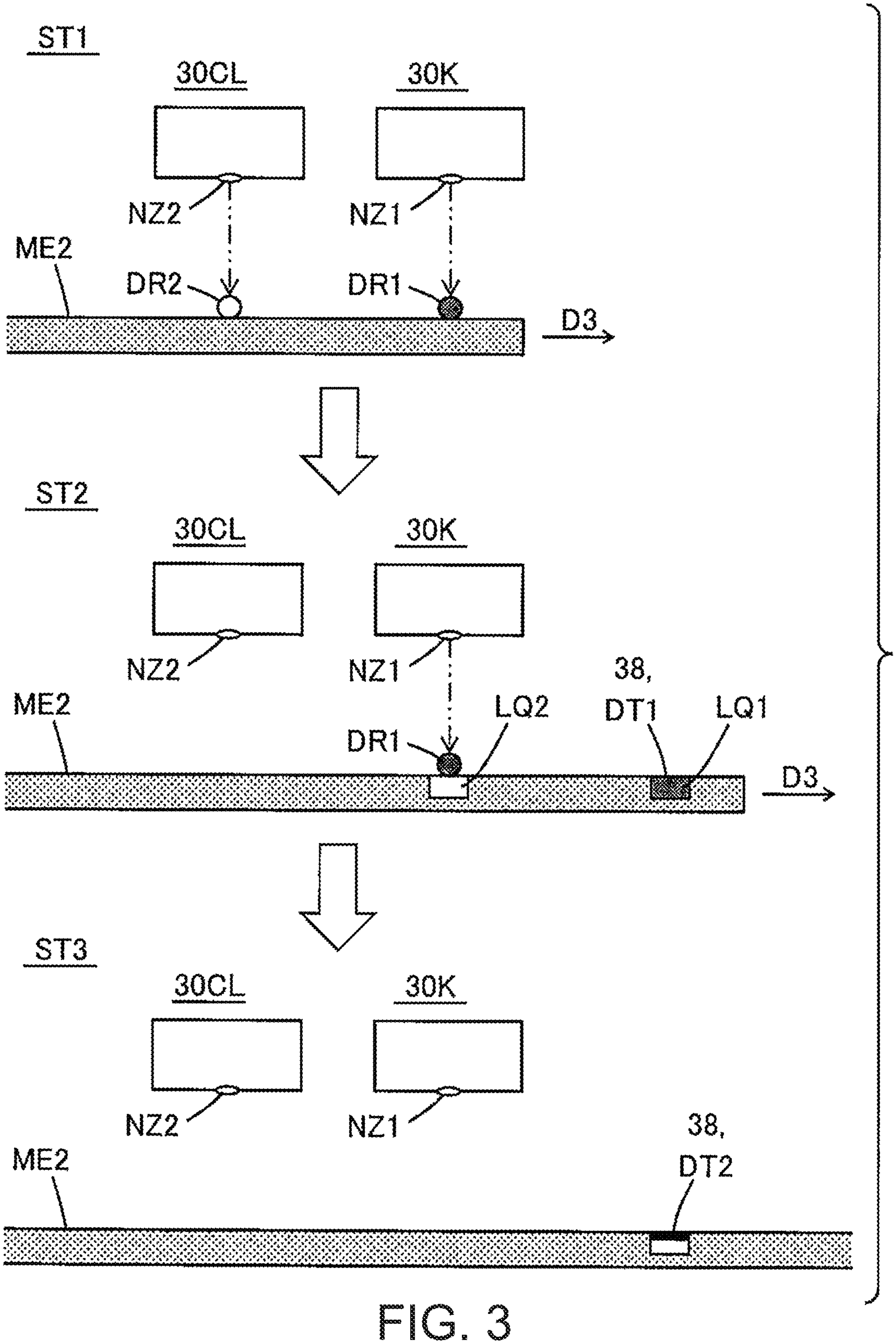
FIG. 3 is a diagram schematically showing an example in which dots of droplets are formed on a permeable type medium as a second medium.
Figure 4:
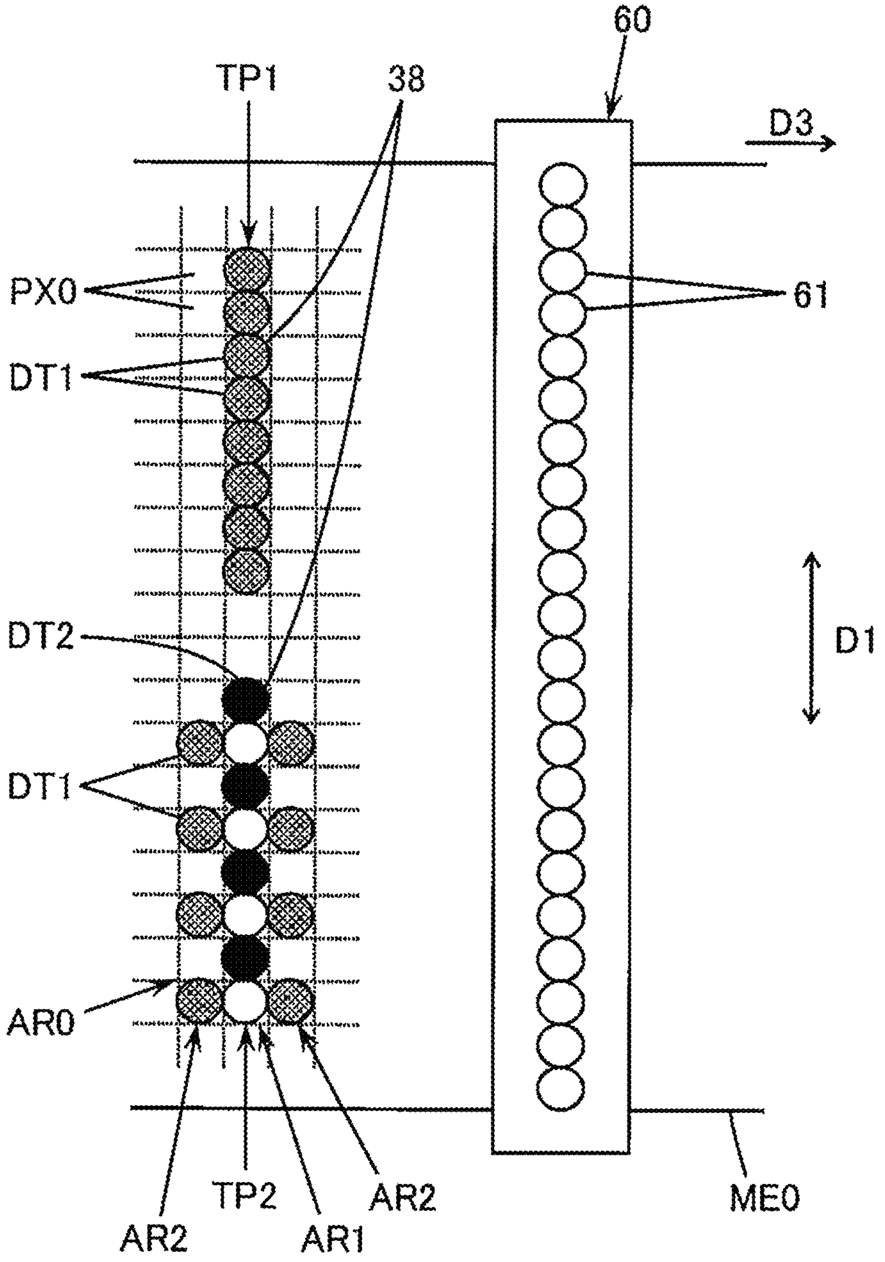
FIG. 4 is a diagram schematically showing an example of a test pattern on a medium and an example of a reading section.
Figure 5:
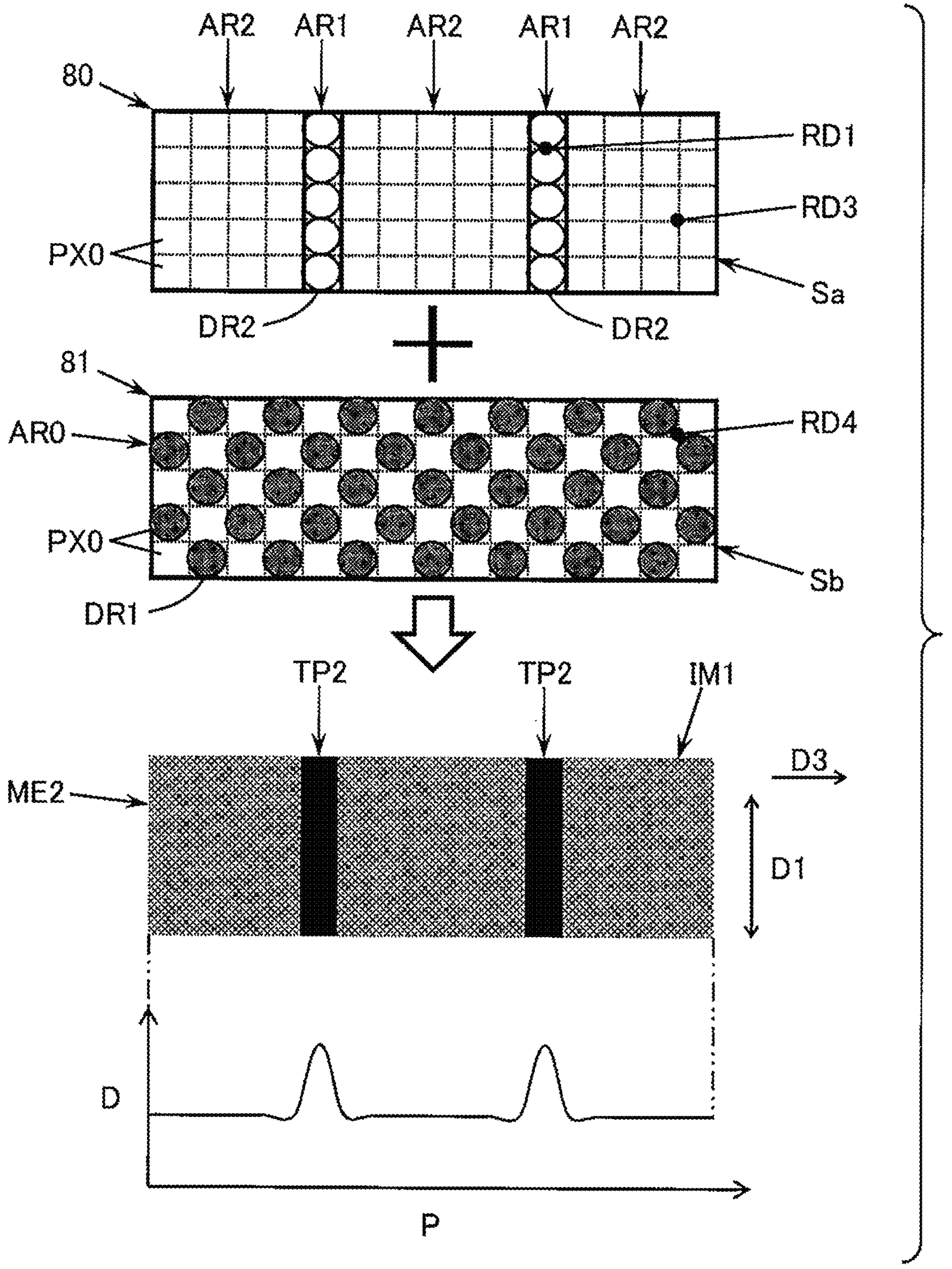
FIG. 5 is a diagram schematically showing an example of forming a test pattern of CL ink droplets as second droplets on a permeable type medium.
Figure 6:
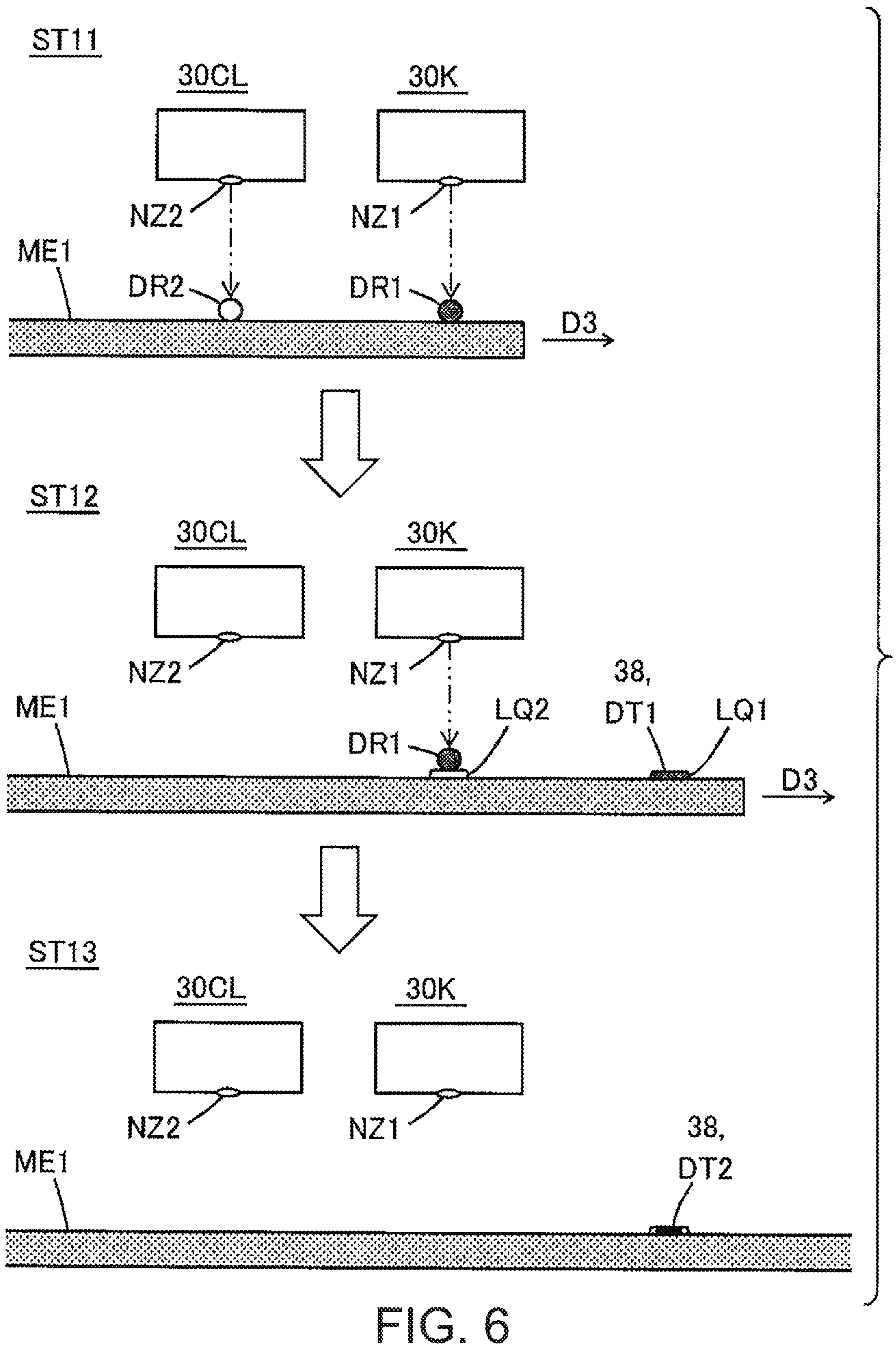
FIG. 6 is a diagram schematically showing an example in which dots of droplets are formed on a non-permeable type medium as a first medium.
Figure 7:
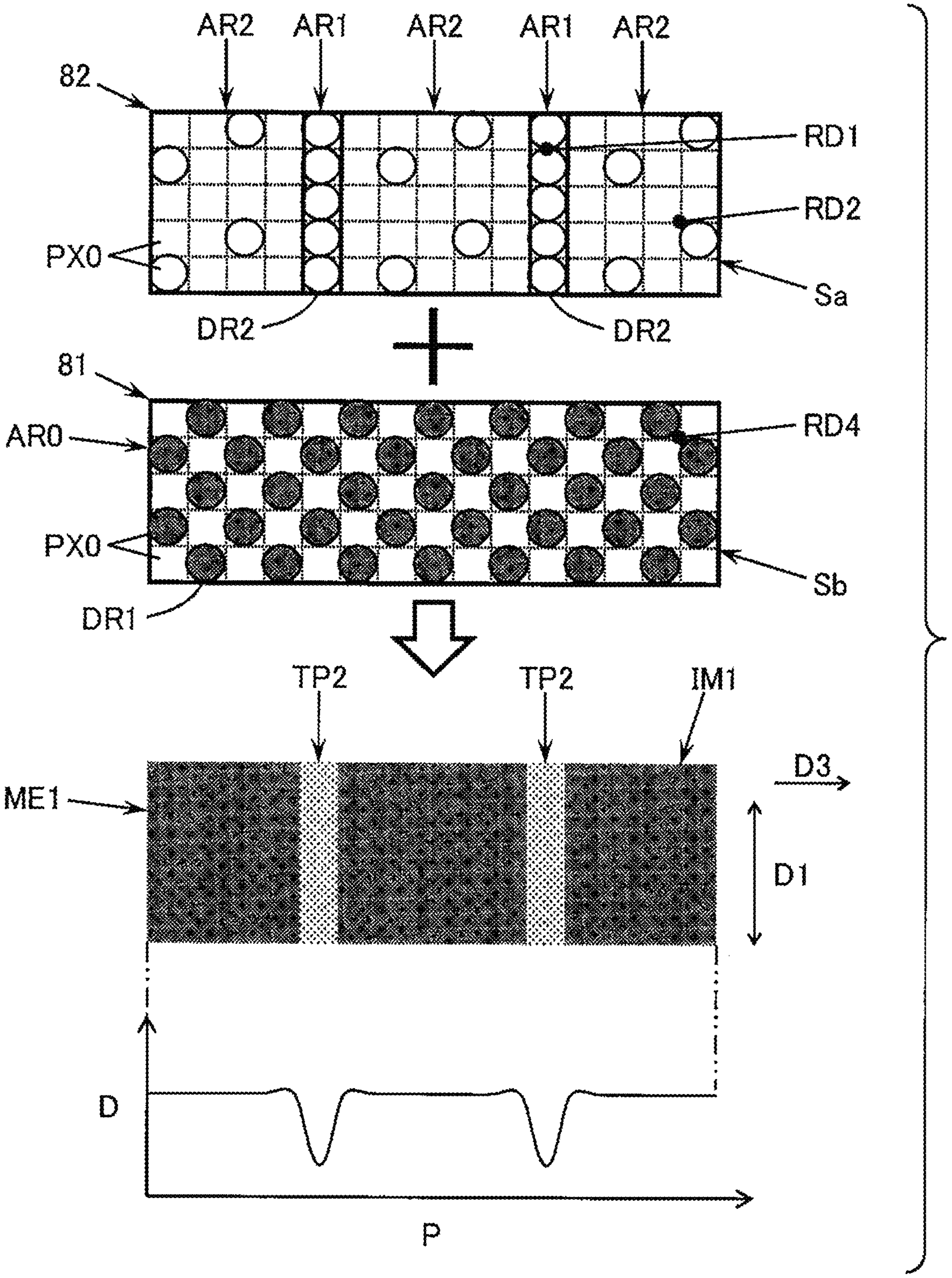
FIG. 7 is a diagram schematically showing an example of forming a test pattern of CL ink droplets as the second droplets on a non-permeable type medium.

As illustrated in FIGS. 1 to 7 and the like, a printing device 1 according to the first aspect of the present technology is a printing device 1 for printing on a medium ME0, which was selected from a plurality of mediums including a first medium (for example, a non-permeable type medium ME1) and a second medium (for example, a permeable type medium ME2) into which droplets 37 more easily permeate than the first medium ME1, and the printing device is provided with a print head 30 and a control section U1. The print head 30 has a plurality of nozzles 34 including a first nozzle (for example, a K nozzle NZ1) capable of ejecting first droplets (for example, K ink droplets DR1) containing a color component onto the medium ME0 and a second nozzle (for example, a CL nozzle NZ2) capable of ejecting, onto the medium ME0, second droplets (for example, CL ink droplets DR2) for changing the coloring by the color component The control section U1 controls ejection of the first droplets (DR1) and the second droplets (DR2) from the print head 30. The control section U1 can execute control to form, on the medium ME0, a test pattern TP2 (see FIGS. 5, 7, and 11) that is for acquiring at least one of the landing position and the landing state of the second droplets (DR2) from the second nozzle (NZ2) and that is included in the ejection range AR0 of the first droplets (DR1). When forming the test pattern TP2, then as illustrated in FIGS. 5, 7, and the like, the control section U1 controls ejection of the second droplets (DR2) from the second nozzle (NZ2) so that the recording density of the second droplets (DR2) in a first region AR1 corresponding to the test pattern TP2 becomes a first recording density RD1, and the recording density of the second droplets (DR2) ejected to the first medium (ME1) in a second region AR2 of the ejection range AR0 excluding the first region AR1 becomes a second recording density RD2 that is higher than 0% and that is lower than the first recording density RD1.

Figure 12:
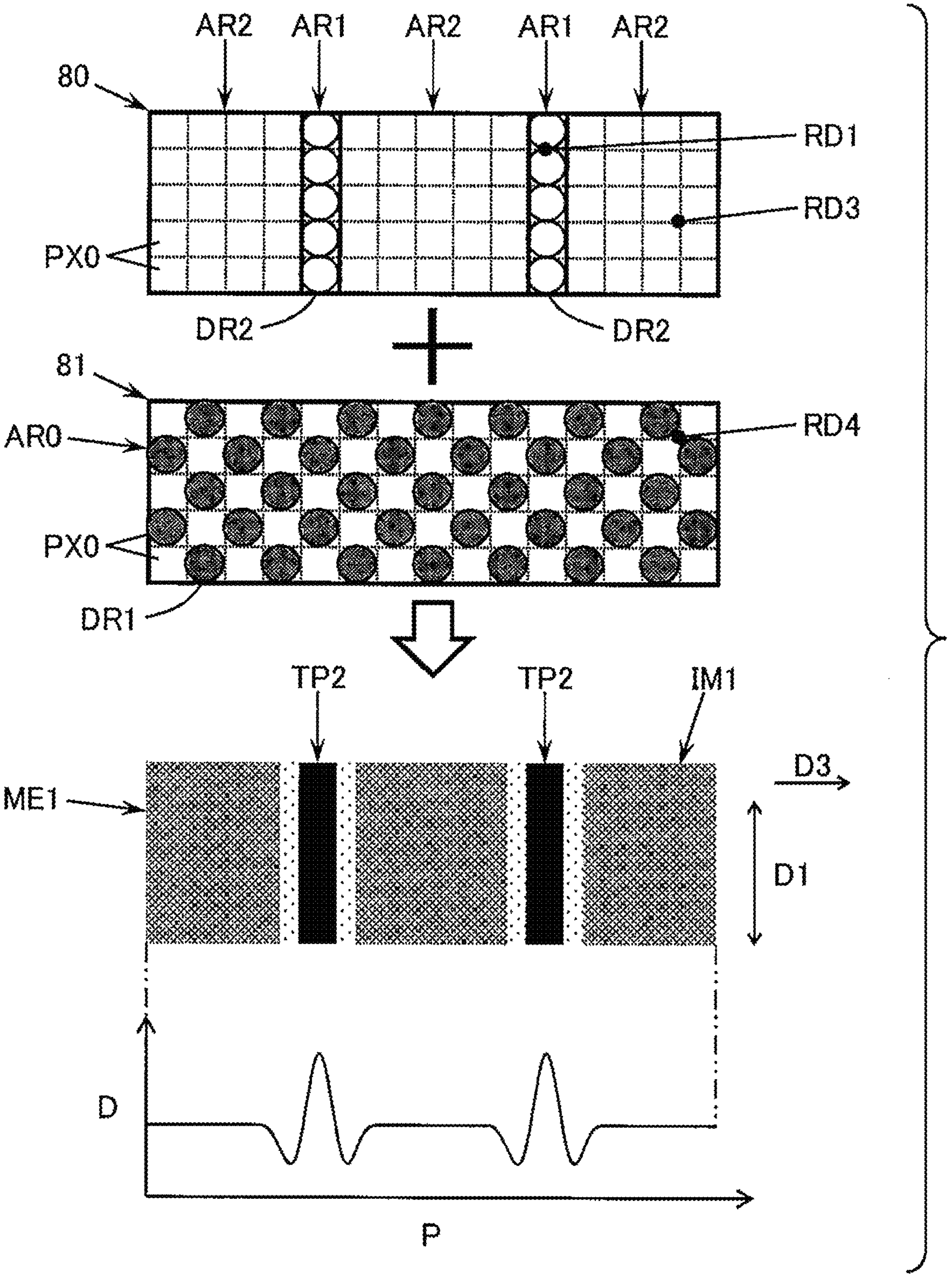
FIG. 12 is a diagram schematically showing a comparative example in which a test pattern of CL ink droplets are formed on a non-permeable type medium.

As illustrated in FIGS. 6 and 7, when the first medium (ME1) through which the droplets 37 tend not to permeate is selected as the medium ME0, since the recording density of the second droplets (DR2) is high on the surface of the first medium (ME1) in the region of the test pattern TP2, the dots 38 of the first droplets (DR1) containing the color component are small, and there will be little coloring. Here, if the recording density of the second droplets (DR2) is low in the second region AR2, which does not correspond to the test pattern TP2, then, as illustrated in FIG. 12, the color component of the first droplets (DR1) is drawn from the vicinity of the region of the test pattern TP2 into the region of the test pattern TP2, and the vicinity of the region of the test pattern TP2 becomes light. Therefore, the test pattern TP2 cannot be clearly read. In the second region AR2, since the recording density of the second droplets (DR2) ejected to the first medium (ME1) is the second recording density RD2, which is higher than 0% and lower than the first recording density RD1, the color component of the first droplets (DR1) spreads across and is fixed onto the surface of the first medium (ME1). By this, as illustrated in FIG. 7, the vicinity of the region of the test pattern TP2 is unlikely to be lighter, and the coloring in the second region AR2 is stronger than that of the region of the test pattern TP2, so that the test pattern TP2 can be clearly read.

As described above, according to the above aspect, it is possible to provide a printing device that makes it easy to read a test pattern of liquid droplets that change the coloring by of a color component even when the test pattern is formed on a medium into which the liquid droplet does not easily permeate.

Various examples of the above-described aspect are conceivable.

Examples of the first medium include a film, a coated paper, and the like.

Examples of the second medium include plain paper, wood-free paper, and textured paper.

The plurality of mediums may include medium that is not categorized as a first medium or a second medium.

Examples of the color component of the first droplet include pigment, dye, and the like.

Examples of the liquid containing a color component include K (black) ink, C (cyan) ink, M (magenta) ink, and Y (yellow) ink. These inks are referred to as colored inks.

Examples of the second droplets include a treatment liquid containing an aggregating agent for aggregating color components, a treatment liquid containing an insolubilizing agent for insolubilizing color components, and the like. These treatment liquids are sometimes referred to as reaction solutions or CL (clear) inks.

The plurality of nozzles may include nozzles that are not categorized as the first nozzle or the second nozzle.

Examples of the test pattern for acquiring the landing positions of the second droplets include an inter-nozzle array adjustment pattern for matching the landing positions of droplets between the nozzle arrays, a reciprocation adjustment pattern for adjusting the landing positions of the second droplets between the time of movement in the forward direction and the time of movement in the reverse direction, and the like. An inter-nozzle array adjustment pattern is used to align the landing position of the first droplets ejected from the nozzle array for ejecting the colored ink and the landing position of the second droplets ejected from the nozzle array for ejecting the CL ink.

The concept of the landing state of the second droplets is not limited to the concept of the presence or absence of landing of the second droplets. For example, the concept of the landing state of the second droplets includes the concept of whether a second droplet has landed normally, a second droplet has landed imperfectly, or a second droplet has not landed. Therefore, the test pattern for acquiring the landing state of the second droplets is not limited to representing whether or not the second nozzle ejects a second droplet, but represents the ejection state of the second droplet from the second nozzle.

Note that recording density (referred to as RD) means a ratio (including a percentage) of the number of dots formed by droplets with respect to a predetermined number of pixels and, in the case where dots of different sizes are formed, means the ratio when converted to the largest dot (for example, a large dot). A pixel is the smallest component of an image to which a color can be assigned independently. For example, when Nd large dots are formed for 100 pixels, the recording density RD is Nd %.

In the present application, "first", "second", and so on are terms for identifying components included in a plurality of components having a similar point, and do not mean an order.

Of course, the above-mentioned additional remarks also apply to the following aspects.

Second Aspect

As illustrated in FIGS. 1, 3, and 5, the control section U1 may control ejection of second droplets (DR2) from the second nozzle (NZ2) so that the recording density of the second droplets (DR2) ejected to the first medium (ME1) becomes a second recording density RD2 higher than the recording density of second droplets (DR2) ejected to the second medium (ME2).

In the above case, when the second medium (ME2) into which droplets 37 easily permeate is selected as the medium ME0, because the recording density of the second droplets (DR2) is low in the second region AR2, which does not correspond to the test pattern TP2, the color component of the first droplets (DR1) permeates into the second medium (ME2) and coloring of the second region AR2 will be weaker than coloring of the region of the test pattern TP2. By this, the test pattern TP2 formed on the medium into which the droplets easily permeate is clearly readable. Therefore, according to the above aspect, it is possible to provide a printing device that makes it easy to read the test pattern of the droplets that change the coloring of the color component, regardless of the type of the medium.

Third Aspect

Figure 2:
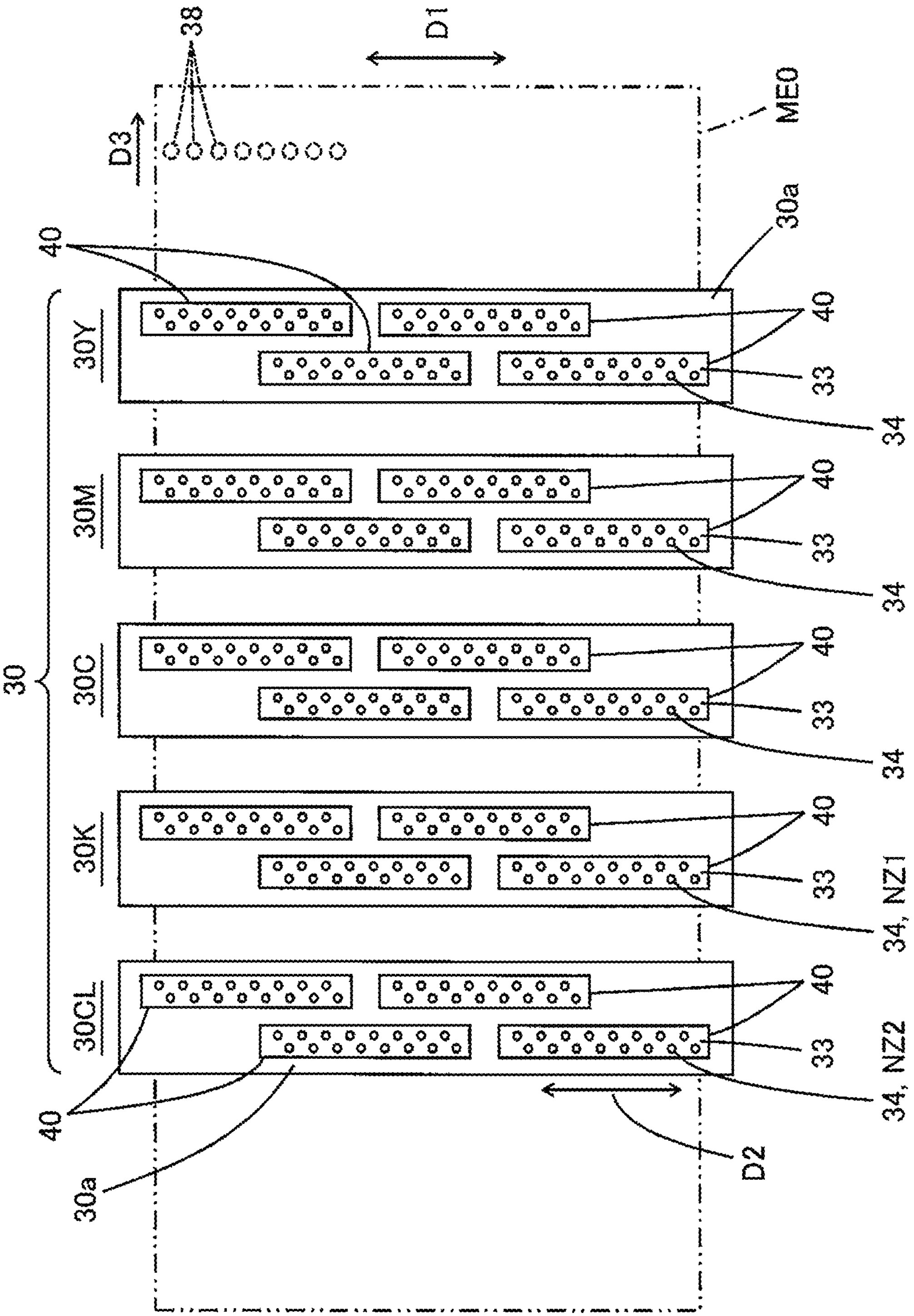
FIG. 2 is a diagram schematically showing an example of a nozzle surface of a print head.

As illustrated in FIGS. 2, 3, and 6, when the control section U1 causes the first droplets (DR1) to land in the first region AR1, the control section U1 may control ejection of the second droplets (DR2) from the second nozzle (NZ2) so that after the second droplets (DR2) land, the first droplets (DR1) overlap and land on the second droplets (DR2).

In the above case, at the instant when the first droplets (DR1) containing the color component land in the first region AR1, they will touch the second droplets (DR2) so the color component stops and becomes fixed on the surface of the medium. Therefore, the above aspect can make the test pattern of the droplets that change the coloring by the color component even easier to read.

Fourth Aspect

Figure 9:
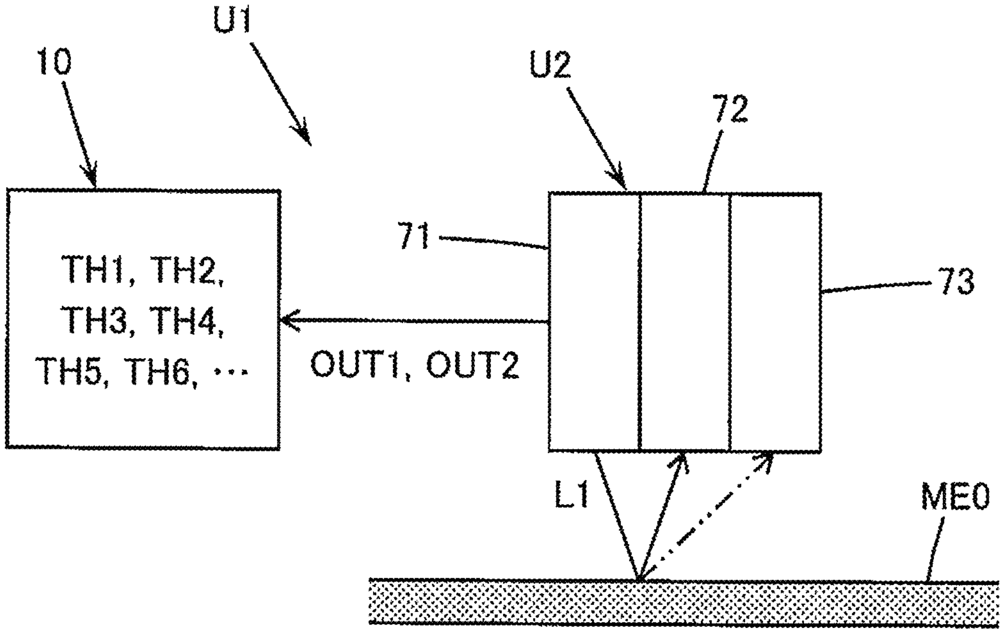
FIG. 9 is a diagram schematically showing an example of a control section including a medium detection section.

As illustrated in FIGS. 1 and 9, the control section U1 may include a medium detection section U2 for detecting the type of the medium ME0 on which the printing is performed. When the type of the medium ME0 detected by the medium detection section U2 corresponds to the first medium (ME1), the control section U1 may control the ejection of the second droplets (DR2) from the second nozzle (NZ2) so that the recording density of the second droplets (DR2) in the second region AR2 becomes the second recording density RD2. When the type of the medium ME0 detected by the medium detection section U2 corresponds to the second medium (ME2), the control section U1 may control the ejection of the second droplets (DR2) from the second nozzle (NZ2) so that the recording density of the second droplets (DR2) in the second region AR2 is lower than the second recording density RD2.

In the above case, the recording density of the second droplet (DR2) in the second region AR2 is automatically controlled based on the detection result of the medium detection section U2. Therefore, according to the above aspect, it is possible to provide a suitable printing device that makes it easy to read the test pattern of the droplets that change the coloring by the color component, regardless of the type of the medium.

Fifth Aspect

As illustrated in FIGS. 3 and 6, the first droplet (DR1) for forming the test pattern TP2 may be a black droplet.

In the above case, the difference in density between the region of the test pattern TP2 and the second region AR2, which does not correspond to the test pattern TP2, becomes large. Therefore, the above aspect can make the test pattern of the droplets that change the coloring by the color component even easier to read.

Sixth Aspect

When forming the test pattern TP2, the control section U1 may control the ejection of the first droplets (DR1) from the first nozzle (NZ1) so that an amount first droplets (DR1) that is from 40% to 60% (for example, K ink recording density RD4 illustrated in FIGS. 5 and 7) of the maximum amount of the first droplets (DR1) that can be ejected into the ejection range AR0 is ejected into the ejection range AR0.

In the above case, since the second region AR2, which does not correspond to the test pattern TP2, has an intermediate recording density, a large difference in density appears between the region of the test pattern TP2 and the second region AR2, which does not correspond to the test pattern TP2. Therefore, the above aspect can make the test pattern of the droplets that change the coloring by the color component even easier to read.

Seventh Aspect

A test pattern forming method according to an aspect of the present technology is a test pattern forming method for a printing device 1 for printing on a medium ME0 selected from a plurality of mediums including a first medium (ME1) and a second medium (ME2) into which droplets 37 permeate more easily than into the first medium (ME1), and includes the following steps (see FIGS. 5 and 7).

(a1) A second droplet ejection step Sa of ejecting the second droplets (DR2) from the second nozzle (NZ2) so that a recording density of the second droplets (DR2) in a first region AR1, which corresponds to the test pattern TP2, becomes a first recording density RD1, and a recording density of the second droplets (DR2) ejected to the first medium (ME1) in a second region AR2 of the ejection range AR0, excluding the first region AR1, becomes a second recording density RD2 that is higher than 0% and that is lower than the first recording density RD1.

(a2) A first droplet ejection step Sb of ejecting the first droplets (DR1) from the first nozzle (NZ1) to the ejection range AR0.

According to the above aspect, it is possible to provide a test pattern forming method that makes it easy to read a test pattern of droplets that change coloring by a color component, regardless of the type of a medium.

Further, the present technology can be applied to a printing system including the above-mentioned printing device, a method for controlling the above-mentioned printing device, a method for controlling the above-mentioned printing system, a control program for the above-mentioned printing device, a control program for the above-mentioned printing system, a computer-readable recording medium on which any of the above-mentioned control programs is recorded, and the like. The above-described printing device may be composed of a plurality of distributed parts.

(2) EXAMPLE OF A PRINTING DEVICE

FIG. 1 schematically illustrates the printing device 1. Although the printing device 1 of this specific example is the printer 2 itself, the printing device 1 may be a combination of the printer 2 and the host device HO1. The printer 2 may include additional elements not shown in FIG. 1. FIG. 2 schematically illustrates nozzle surfaces 30*a* of the print head 30. FIG. 3 schematically shows a state in which a dot 38 of a droplet 37 is formed on the permeable type medium ME2 as the second medium. FIG. 4 schematically illustrates test patterns TP1 and TP2 on the medium ME0 and the reading section 60. Note that the shape of the dot 38 shown in FIG. 4 is merely a schematic shape for indicating the landing position on the medium ME0 and, in practice, a plurality of dots 38 included in the test patterns TP1 and TP2 may spread and interconnect on the medium ME0.

The printer 2 shown in FIG. 1 is a line type printer, which is a kind of ink jet printer that ejects ink droplets as droplets 37. The printer 2 includes a controller 10, a RAM 21 as a semiconductor memory, a transmission I/F 22, a storage section 23, an operation panel 24, a print head 30, a transport section 50, a reading section 60, a medium detection section U2, and the like. Here, RAM is an abbreviation for random access memory, and I/F is an abbreviation for interface. The controller 10 and the medium detection section U2 are examples of the control section U1. Note that at least one of the reading section 60 and the medium detection section U2 may not be provided in the printer 2. The controller 10, the RAM 21, the transmission I/F 22, the storage section 23, and the operation panel 24 are connected to a bus, and can input and output information to and from each other.

As shown in FIGS. 2 and 3, the printer 2 can eject CL ink droplets DR2 from the print head 30 in addition to first droplets containing a color component such as K ink droplets DR1, which are black droplets. The color component may be a chromatic component or an achromatic component. Examples of the color component include a C color material, an M color material, a Y color material, and a K color material. The coloring material may be a pigment or a dye. K ink LQ1 containing a black pigment is an example of a first liquid containing a color component, and a K ink droplet DR1 is an example of a first droplet containing a color component. The CL ink droplets DR2 are droplets of CL ink LQ2, which changes the coloring by the color component in the first droplet, and does not contain a color component. The CL ink LQ2 is an example of a second liquid for changing the coloring by the color component of the first liquid, and is also referred to as a treatment liquid or a reaction liquid. In this embodiment, it is assumed that the color component of the first liquid is a pigment and that the CL ink LQ2 contains an aggregating agent for aggregating the pigment. A CL ink droplet DR2 is an example of a second droplet that changes the coloring the color component in the first droplet.

As the first liquid such as the K ink LQ1, for example, a pigment ink containing a dispersion medium such as water, a pigment, a surfactant, and the like can be used. The pigment may be an inorganic pigment or an organic pigment. As the surfactant, an acetylene glycol-based surfactant, a fluorine-based surfactant, a silicone-based surfactant, or the like can be used. For example, a liquid containing a solvent such as water, a cationic compound, the above-mentioned surfactant, and the like can be used as the second liquid such as the CL ink LQ2. A cationic compound aggregates the pigment and suppresses bleeding and degradation of coloring. A polyvalent metal salt, an organic acid, a cationic resin, a cationic surfactant, or the like can be used as the cationic compound.

Note that when the color component of the first liquid is a dye, the CL ink LQ2 may contain an insolubilizing agent for insolubilizing the dye.

The controller 10 includes a CPU 111 serving as a processor, a color conversion section 12, a halftone processing section 13, a drive signal transmission section 15, and the like. Here, CPU is an abbreviation for central processing unit. Based on the original image data DA1 acquired from the host device HO1, a memory card (not shown), or the like, the controller 10 controls the transport section 50 and the print head 30 so that the printed image IM0 is formed on the medium ME0, which is a print medium. As the original image data DA1, for example, RGB data having an integer value of $2^8$ gradations or $2^{16}$ gradations of R, G, and B can be applied to each pixel. Here, R means red, G means green, and B means blue.

The controller 10 may be constituted by an SoC or the like. Here, SoC is an abbreviation for system on a chip.

The CPU 11 is a device that mainly performs information processing and control in the printer 2.

The color conversion section 12, for example, converts the RGB data into ink amount data DA2 having integer values of $2^8$ gradations or $2^{16}$ gradations of C, M, Y, and K for each pixel, while referring to a color conversion LUT in which the correspondence relationship between the gradation values of R, G, and B and the gradation values of C, M, Y, and K is defined. LUT is an abbreviation of a look-up table. The ink amount data DA2 represents the amounts of the C, M, Y, and K liquids 36 used in units of the pixels PX0 shown in FIG. 4. When the resolution of the RGB data is different from the printing resolution, the color conversion section 12 first converts the resolution of the RGB data into the printing resolution or converts the resolution of the ink amount data DA2 into the printing resolution.

The halftone processing section 13 generates dot data DA3 by reducing the number of gradations in the gradation values by performing halftone processing by any one of a dither method, an error diffusion method, or the like on the gradation values of each pixel PX0 constituting the ink amount data DA2. The dot data DA3 represents the state of formation of the dots 38 by the droplets 37 in units of the pixels PX0. The dot data DA3 may be binary data representing the presence or absence of dot formation, or may be multi-valued data having three or more gradation levels that can correspond to dots of different sizes, such as small, medium, and large dots. The halftone processing section 13 includes binary data or multi-valued data in the dot data DA3 that represents, as shown in FIGS. 3 and 4, the state of formation of dots 38 of the CL ink droplets DR2 in units of pixels PX0 in accordance with the landing position of the color ink droplets such as the K ink droplets DR1.

The drive signal transmission section 15 generates, from the dot data DA3, a drive signal SG1 corresponding to a voltage signal to be applied to the drive element 32 of the print head 30 and outputs the drive signal SG1 to the drive circuit 31 of the print head 30. For example, if the dot data DA3 is "dot formation", the drive signal transmission section 15 outputs a drive signal SG1 for ejecting droplets for dot formation. When the dot data DA3 is four level data, the drive signal transmission section 15 outputs a drive signal SG1 for ejecting droplets for a large dot when the dot data DA3 is "large dot formation", outputs a drive signal SG1 for ejecting droplets for a medium dot when the dot data DA3 is "medium dot formation", and outputs a drive signal SG1 for ejecting droplets for a small dot when the dot data DA3 is "small dot formation".

Each of the sections 11, 12, 13, and 15 may be constituted by an ASIC, and data to be processed may be directly read from the RAM 21 and data after processing may be directly written into the RAM 21. Here, ASIC is an abbreviation of application specific integrated circuit.

The print head 30 shown in FIGS. 1 to 3 is divided into a print head 30CL, a print head 30K, a print head 30C, a print head 30M, and a print head 30Y, which are arranged in this order in the feed direction D3 of the medium ME0. Of course, the print heads 30CL, 30K, 30C, 30M, and 30Y may be divided into two to four parts, and the print heads 30CL, 30K, 30C, 30M, and 30Y may not be divided. The print head 30CL has a plurality of CL nozzles NZ2 capable of ejecting CL ink droplets DR2 onto the medium ME0. The CL nozzles NZ2 are examples of a second nozzle capable of ejecting second droplets. The print head 30K has a plurality of K nozzles NZ1 capable of ejecting K ink droplets DR1 to the medium ME0. The K nozzles NZ1 are examples of a first nozzle capable of ejecting first droplets. The print head 30C has a plurality of nozzles 34 capable of ejecting droplets 37 of the C ink to the medium ME0. The print head 30M has a plurality of nozzles 34 capable of ejecting droplets 37 of M ink onto the medium ME0. The print head 30Y has a plurality of nozzles 34 capable of ejecting droplets 37 of Y ink onto the medium ME0. The plurality of nozzles 34 include a K nozzle NZ1 as a first nozzle and a CL nozzle NZ2 as a second nozzle.

Each of the print heads 30CL, 30K, 30C, 30M, and 30Y includes a plurality of chips 40 so that a plurality of nozzles 34 are arranged continuously over the entire width direction D1 of the medium ME0. The width direction D1 is a direction orthogonal to the feed direction D3 in FIG. 2, and is a direction intersecting the feed direction D3. Each chip 40 has, on its nozzle surface 30*a*, a nozzle array 33 in which a plurality of nozzles 34 are arranged in a staggered pattern in the arrangement direction D2. In other words, the nozzles 34 included in each nozzle array 33 are arranged in two rows in the arrangement direction D2. Although the arrangement direction D2 is the width direction D1 in FIG. 2, the arrangement direction D2 may be shifted from the width direction D1 as long as the arrangement direction D2 intersects the feed direction D3. Here, nozzle means a small hole from which liquid droplets are ejected, and nozzle array means an arrangement of nozzles. The nozzle surface 30*a* is an ejection surface of the droplets 37. Each of the droplets 37 is ejected from the nozzle 34 targeting the pixels PX0 of the medium ME0. Of course, CL dots 38 are formed from the CL ink droplets DR2 on the medium ME0, K dots 38 are formed from the K ink droplets DR1 on the medium ME0, C dots 38 are formed from the C droplets 37 on the medium ME0, M dots 38 are formed from the M droplets 37 on the medium ME0, and Y dots 38 are formed from the Y droplets 37 on the medium ME0.

The transport section 50 controlled by the controller 10 drives the roller drive section 55 to transport the medium ME0 in the feed direction D3 along the transport path 59. In FIG. 1, the feed direction D3 is the right direction, the left side is referred to as the upstream side, and the right side is referred to as the downstream side. The roller drive section 55 includes a transport roller pair 56 and a discharge roller pair 57. The roller drive section 55 is constituted by a servo motor, and rotates the drive transport roller of the transport roller pair 56 and the drive discharge roller of the discharge roller pair 57 at a constant speed under the control of the controller 10 to thereby feed the medium ME0 in the feed direction D3 at a constant speed. Therefore, it can be said that the transport section 50 moves at least one of the medium ME0 and the print head 30 along the feed direction D3. The platen 58 is located below the transport path 59, and supports the medium ME0 by being in contact with the medium ME0 in the transport path 59. The print head 30 controlled by the controller 10 is provided with a drive circuit 31, a drive element 32, and the like, and deposits the liquid 36 onto the medium ME0 by ejecting droplets 37 toward the medium ME0 supported by the platen 58. Therefore, it can be said that the control section U1 controls the ejection of the droplets 37, such as the first droplets and the second droplets, from the print head 30.

The drive circuit 31 applies a voltage signal to the drive element 32 in accordance with the drive signal SG1 input from the drive signal transmission section 15. The drive element 32 may be a piezoelectric element that applies pressure to the liquid 36 in a pressure chamber that communicates with the nozzle 34, or may be a drive element that generates bubbles in the pressure chamber by heat to eject the droplets 37 from the nozzle 34. The liquid 36 is supplied from the liquid cartridge 35 to the pressure chamber of the print head 30. The liquid 36 in the pressure chamber is ejected as droplets 37 from the nozzle 34 toward the medium ME0 by the drive element 32. By this, dots 38 of the droplets 37 are formed on the medium ME0 and a printed image IM0 represented by the pattern of dots 38 is formed on the medium MEG.

The RAM 21 stores the original image data DA1 and the like received from the host device HO1, a memory (not shown), or the like. The transmission I/F 22 is connected by wire or wirelessly to the host device HO1 and inputs and outputs information to and from the host device HO1. Examples of the host device HO1 include a computer such as a personal computer or a tablet terminal, a mobile phone such as a smartphone, a digital camera, and a digital video camera. The storage section 23 may be a nonvolatile semiconductor memory such as a flash memory, or a magnetic storage device such as a hard disk. The operation panel 24 includes an output section 25 such as a liquid crystal panel for displaying information, an input section 26 such as a touch panel for receiving an operation on a display screen, and the like.

As shown in FIG. 4, the printer 2 can form the test pattern TP1 for acquiring the landing position of the K ink droplets DR1 from the K nozzles NZ1 and the test pattern TP2 for acquiring the landing position of the CL ink droplets DR2 from the CL nozzles NZ2. The controller 10 can execute control for forming the test patterns TP1 and TP2 on the medium ME0. The reading section 60 includes, for example, a plurality of reading elements 61 arranged along the width direction D1 so as to have a reading resolution, and the test patterns TP1 and TP2 are read by the plurality of reading elements 61. Note that the arrangement direction of the plurality of reading elements 61 may be shifted from the width direction D1 as long as it intersects with the feed direction D3. The reading section 60 shown in FIG. 1 is disposed downstream of the print head 30. The reading section 60 may be an image sensor such as a contact image sensor system, which is abbreviated as CIS system, or a charge coupled device system, which is abbreviated as CCD system, or may be a solid state image sensor such as a CMOS image sensor, or a line sensor or an area sensor constituted by a CCD. Here, CMOS is an abbreviation of complementary metal-oxide semiconductor.

When the printer 2 does not have the reading section 60, the test patterns TP1 and TP2 may be read by an external reading apparatus.

The medium ME0 shown in FIGS. 1 to 4 is an elongated print medium continuous in the feed direction D3. Such an elongated print medium is supplied, for example, as roll paper. Of course, the medium ME0 may be a non-continuous printing medium such as cut sheets. Therefore, the shape of the medium ME0 is not limited to a roll shape, and may be a rectangular shape, a circular shape, or a three dimensional shape.

There are various types of the medium ME0 set in the printer 2, and there is a medium into which the droplets 37 easily permeate and also a medium into which the droplets 37 do not easily permeate. In this specific example, a medium into which the droplets 37 are unlikely to permeate is referred to as a non-permeable type medium ME1, and a medium into which the droplets 37 easily permeate is referred to as a permeable type medium ME2. Examples of the non-permeable type medium ME1 include film, coated paper, metal, and the like. Examples of the permeable type medium ME2 include plain paper, wood-free paper, textured paper, and cloth. The non-permeable type medium ME1 is an example of a first medium into which the droplets 37 are less likely to permeate than into the permeable type medium ME2. The permeable type medium ME2 is an example of a second medium into which the droplets 37 more easily permeate than into the non-permeable type medium ME1. The printer 2 performs printing on a medium ME0 selected from the plurality of mediums including the non-permeable type medium ME1 and the permeable type medium ME2. The medium detection section U2 shown in FIG. 1 can detect the type of the medium ME0 on which printing is performed. Details of the medium detection section U2 will be described later.

First, with reference to FIG. 3, an example of the behavior of the K ink droplets DR1 and the CL ink droplets DR2 ejected from the K nozzles NZ1 and the CL nozzles NZ2 to the permeable type medium ME2 will be described.

The upper part of FIG. 3 shows a state ST1 in which the K nozzle NZ1 ejects a K ink droplet DR1 to the permeable type medium ME2 and, at the same time, the CL nozzle NZ2 ejects a CL ink droplet DR2 to the permeable type medium ME2. The permeable type medium ME2 is moving at a constant speed in the feed direction D3. The middle part of FIG. 3 shows a state ST2 in which the K nozzle NZ1 ejects a K ink droplet DR1 at the landing position of the CL ink droplet DR2. At this time, the K ink droplet DR1 that landed on the permeable type medium ME2 permeates into the permeable type medium ME2 as the K ink LQ1, and the CL ink droplet DR2 that landed on the permeable type medium ME2 permeates into the permeable type medium ME2 as the CL ink LQ2. The middle part of FIG. 3 also shows a first dot DT1 generated on the surface of the permeable type medium ME2 by the K ink droplet DR1 that landed by itself on the permeable type medium ME2. When the K ink droplet DR1 lands on the landing position of the CL ink droplet DR2, the pigment of the K ink droplet DR1 is caused to aggregate by the CL ink LQ2 and remains near the surface of the permeable type medium ME2. The lower part of FIG. 3 shows a state ST3 in which the K ink droplet DR1 generated a second dot DT2 on the surface of the permeable type medium ME2 by landing on the landing position of a CL ink droplet DR2. The second dot DT2 is darker than the first dot DT1. Although not shown, a C, M, or Y liquid droplet 37 that lands on the landing position of a CL ink droplet DR2 will also form a dark dot 38 on the permeable type medium ME2 by the same action. Thus, the pigment-containing droplet 37 and the CL ink droplet DR2 overlap on the permeable type medium ME2 to form a printed image IM0 on the permeable type medium ME2 having a pattern of distinct dots 38.

When a droplet containing pigment and a droplet of the CL ink LQ2 are to be superimposed on the medium ME0, an inter-nozzle array adjustment for matching the landing positions of these droplets is necessary. For the inter-nozzle array adjustment, the controller 10 can execute control for forming the test patterns TP1 and TP2 on the medium ME0 as shown in FIG. 4. As described above, in practice, the plurality of dots 38 included in the test patterns TP1 and TP2 may spread and interconnect on the medium ME0. In order to align the landing positions of the droplets 37 from the nozzle arrays 33 of the print heads 30K, 30C, 30M, and 30Y and the nozzle array 33 of the print head 30CL, the test patterns TP1 and TP2 are linear dot patterns along the width direction D1. The test patterns TP1 and TP2 can also be referred to as inter-nozzle array adjustment patterns. FIG. 4 shows a test pattern TP1 formed by first dots DT1 of K ink droplets DR1 and a test pattern TP2 formed by second dots DT2 of CL ink droplets DR2 and K ink droplets DR1. Since the CL ink LQ2 does not contain a color component, it is not easy to grasp the landing position of the CL ink droplets DR2 from the test pattern if a test pattern is formed on the medium ME0 by the CL ink LQ2 alone. Therefore, the position of the test pattern TP2 is made easier to understand by ejecting a liquid droplet containing a pigment such as the K ink droplets DR1 in a wider range than the test pattern of the CL ink droplets DR2 on the medium ME0. Therefore, the ejection range AR0 of the liquid droplets containing the pigment such as the K ink droplets DR1 includes the first region AR1 corresponding to the test pattern TP2 and the second region AR2 excluding the first region AR1.

Note that the controller 10 may cause the print head 30CL to eject the CL ink droplets DR2 in a predetermined recording density over a range wider than the test pattern TP1 of the K ink droplets DR1. In this case, the pigment of the K ink droplets DR1 are caused to aggregate at the surface of the medium ME0 by the CL ink LQ2 in the region of the test pattern TP1, and a visible test pattern TP1 is formed.

FIG. 5 schematically shows an example in which the test pattern TP2 of the CL ink droplets DR2 as the second droplet is formed on the permeable type medium ME2. In the uppermost portion of FIG. 5 is shown an ejection pattern 80 of the CL ink droplets DR2 in the ejection range AR0 of the K ink droplets DR1 for forming the test pattern TP2. An ejection pattern 81 of the K ink droplets DR1 is shown immediately below the ejection pattern 80. A test pattern TP2 and a background image IM1 on the permeable type medium ME2 are shown immediately below the ejection pattern 81. The lowest part of FIG. 5 shows the read density D corresponding to position P in the feed direction D3. The read density D corresponds to the result of reading the ejection range AR0 by the reading section 60.

The printer 2 performs a second droplet ejection step Sa in which CL ink droplets DR2 are ejected from a CL nozzles NZ2 so that the ejection pattern 80 is formed, and a first droplet ejection step Sb in which K ink droplets DR1 are ejected from a K nozzles NZ1 to an ejection range AR0 so that the ejection pattern 81 is formed.

In the ejection pattern 80 of the CL ink droplets DR2, the recording density of the CL ink droplets DR2 in the first region AR1, which corresponds to the test pattern TP2, is defined as a first recording density RD1. Note that the recording density RD is a ratio (including a percentage) of the number of CL ink droplets DR2 ejected to the number of pixels in the target region In the case where CL ink droplets DR2 having different sizes are ejected, it means the ratio when converted into the largest CL ink droplet DR2. Since the test pattern TP2 becomes clear when the first recording density RD1 is high, it is desirable that the first recording density RD1 be high. The first recording density RD1 of the first region AR1, which corresponds to the linear test pattern TP2 shown in FIG. 5, is 100% ejection of CL ink droplets DR2 to all the pixels PX0. When CL ink droplets DR2 having different sizes are ejected from the CL nozzles NZ2, the first recording density RD1 being 100% means that the largest CL ink droplet DR2 is ejected to all the pixels PX0.

In the ejection pattern 80 of CL ink droplets DR2, the recording density of the CL ink droplets DR2 in the second region AR2, which is the ejection range AR0 of the K ink droplets DR1 excluding the first region AR1, is defined as a third recording density RD3. In the case where the medium ME0 is the permeable type medium ME2, the third recording density RD3 is desirably low because the test pattern TP2 becomes clearer when the third recording density RD3 is low. The third recording density RD3 of the second region AR2 shown in FIG. 5 is 0%, that is, no CL ink droplets DR2 are ejected to any of the pixels PX0.

In the ejection pattern 81 of the K ink droplets DR1, the recording density of the K ink droplets DR1 is substantially uniform over the entire ejection range AR0 of the K ink droplets DR1. Assuming that this recording density is the K ink recording density RD4, the K ink recording density RD4 is desirably 40 to 60%. In other words, when the test pattern TP2 is formed, it is desirable that the K ink droplets DR1 be ejected in the ejection range AR0 in an amount of 40% to 60% of the maximum amount of K ink droplets DR1 that can be ejected in the ejection range AR0. This is because when the K ink recording density RD4 is an intermediate recording density, the density difference becomes large between the denser first region AR1, which corresponds to the test pattern TP2, and the lighter peripheral second region AR2.

As described above, when forming the test pattern TP2, the controller 10 controls ejection of the K ink droplets DR1 from the K nozzles NZ1 so that the K ink droplets DR1 are ejected into the ejection range AR0 in an amount of 40% to 60% of the maximum amount in which the K ink droplets DR1 can be ejected into the ejection range AR0.

As shown in FIGS. 2 and 3, the print head 30K is capable of depositing the K ink droplets DR1 at the landing positions of the CL ink droplets DR2. When a K ink droplet DR1 is deposited in the ejection range AR0, which includes the first region AR1 and the second region AR2, the controller 10 controls ejection of the CL ink droplets DR2 from the CL nozzles NZ2 so that, after the CL ink droplets DR2 land, the K ink droplets DR1 land so as to overlap the CL ink droplets DR2.

When the permeable type medium ME2 is selected as the medium ME0, the CL ink LQ2 permeates inside the permeable type medium ME2 as shown in FIG. 3 when the CL ink droplet DR2 lands in the first region AR1, which corresponds to the test pattern TP2. When K ink droplets DR1 land in the first region AR1 afterward, the pigment in the K ink droplets DR1 is caused to aggregate by the CL ink LQ2 and stays at the surface of the permeable type medium ME2, and a dense second dot DT2 is formed on the permeable type medium ME2. In the second region AR2, which does not correspond to the test pattern TP2, the pigment of the K ink droplets DR1 permeates into the permeable type medium ME2 because the recording density of the CL ink droplets DR2 is low. As a result, as shown in FIG. 5, the coloring of the background image IM1 becomes weaker than the coloring of the first region AR1, which corresponds to the test pattern TP2. As shown in the lowest part of FIG. 5, the read density D read by the reading section 60 is high at the position of the test pattern TP2 and low at the peripheral second region AR2.

Thus, the test pattern TP2 printed on the permeable type medium ME2 can be clearly read.

As a result of experiments, it was found that when, such as shown in FIG. 6, the non-permeable type medium ME1 is selected as the medium ME0, the test pattern TP2 cannot be clearly read when the test pattern TP2 is formed according to the ejection patterns 80 and 81 shown in FIG. 5.

First, an example of the behavior of the K ink droplets DR1 and the CL ink droplets DR2 ejected from the K nozzle NZ1 and the CL nozzle NZ2 to the non-permeable type medium ME1 as the first medium will be described with reference to FIG. 6.

The upper part of FIG. 6 shows a state ST11 in which the K nozzle NZ1 ejects a K ink droplet DR1 onto the non-permeable type medium ME1 and, at the same time, the CL nozzle NZ2 ejects a CL ink droplet DR2 onto the non-permeable type medium ME1. The non-permeable type medium ME1 is moving at a constant speed in the feed direction D3. The middle part of FIG. 6 shows a state ST12 in which the K nozzle NZ1 ejects a K ink droplet DR1 onto the landing position of the CL ink droplet DR2. At this time, the K ink droplet DR1 that landed on the non-permeable type medium ME1 remains on the surface of the non-permeable type medium ME1 as the K ink LQ1, and the CL ink droplet DR2 that landed on the non-permeable type medium ME1 remains on the surface of the non-permeable type medium ME1 as the CL ink LQ2. The middle part of FIG. 6 also shows a first dot DT1 generated on the surface of the non-permeable type medium ME1 by the K ink droplets DR1 that landed by itself on the non-permeable type medium ME1. When the K ink droplet DR1 lands on the landing position of the CL ink droplet DR2, the pigment of the K ink droplets DR1 immediately aggregates due to the CL ink LQ2 that remains on the surface of the non-permeable type medium ME1. The lower part of FIG. 6 shows a state ST13 in which a second dot DT2 is generated on the surface of the non-permeable type medium ME1 by the K ink droplet DR1 that landed at the landing position of the CL ink droplet DR2. Since the pigment of the K ink droplets DR1 that landed at the landing position of the CL ink droplets DR2 immediately aggregates due to the CL ink LQ2, the second dot DT2 is smaller than the first dot DT1, which does not overlap any CL ink droplet DR2. As a result, when a portion where the second dots DT2 are grouped together on the non-permeable type medium ME1 is compared with a portion where the first dots DT1 are grouped together, a density inversion phenomenon occurs in which the portion where the second dots DT2 are grouped together is lighter than the portion where the first dots DT1 are grouped together. Although not shown, also in the case where droplets 37 of C, M, or Y land on the landing position of the CL ink droplets DR2 on the non-permeable type medium ME1, by the same action, the portion where the dots overlapping the CL ink droplets DR2 are grouped together will be lighter than the portion where the dots not overlapping the CL ink droplets DR2 are grouped together.

As shown in FIG. 12, in the first region AR1, which corresponds to the test pattern TP2, the first dots DT1 of the K ink droplets DR1 containing the pigment are small and coloring is slight because the recording density (first recording density RD1) of the CL ink droplets DR2 is high on the surface of the non-permeable type medium ME1. Since the CL ink droplets DR2 are not deposited in the second region AR2, which does not correspond to the test pattern TP2, the pigment of the K ink droplets DR1 is sucked from the vicinity of the first region AR1 into the first region AR1, and the vicinity of the region of the test pattern TP2 becomes light. As shown in the lowermost portion of FIG. 12, the read density D read by the reading section 60 is high at the position of the test pattern TP2 but in the vicinity around the region of the test pattern TP2, is lower than the peripheral second region AR2.

As described above, as illustrated in FIG. 12, even if the test pattern TP2 of the CL ink droplets DR2 is formed on the non-permeable type medium ME1 according to the ejection patterns 80 and 81 shown in FIG. 5, the test pattern TP2 cannot be clearly read. FIG. 12 schematically shows a comparative example in which the test pattern TP2 of the CL ink droplets DR2 is formed on the non-permeable type medium ME1 according to the ejection patterns 80 and 81. The test pattern TP2 and the background image IM1 on the non-permeable type medium ME1 are shown immediately below the ejection pattern 81. The lowest part of FIG. 12 shows the read density D corresponding to position P in the feed direction D3.

Therefore, as illustrated in FIG. 7, the recording density of the CL ink droplets DR2 in the second region AR2, which excludes the first region AR1 of the ejection range AR0 of the K ink droplets DR1, is set to be higher than the third recording density RD3 and lower than the first recording density RD1 shown in FIG. 5. FIG. 7 schematically shows an example in which the test pattern TP2 of the CL ink droplets DR2 as the second droplet is formed on the non-permeable type medium ME1. The ejection pattern 82 of the CL ink droplets DR2 in the ejection range AR0 of the K ink droplets DR1 is shown in the uppermost portion of FIG. 7. The ejection pattern 81 of the K ink droplets DR1 is shown immediately below the ejection pattern 82. The test pattern TP2 and the background image IM1 on the non-permeable type medium ME1 are shown immediately below the ejection pattern 81. The lowest part of FIG. 7 shows the read density D corresponding to position P in the feed direction D3.

The printer 2 carries out a second droplet ejection step Sa in which CL ink droplets DR2 are ejected from CL nozzles NZ2 so that an ejection pattern 82 is formed, and a first droplet ejection step Sb in which K ink droplets DR1 are ejected from K nozzles NZ1 to the ejection range AR0 so that an ejection pattern 81 is formed.

In the ejection pattern 82 of the CL ink droplets DR2, the recording density of the second region AR2 is defined as a second recording density RD2. The second recording density RD2 is desirably 20 to 30% from the viewpoint of desirably suppressing the generation of faint lines in the vicinity of the region of the test pattern TP2 as shown in FIG. 12. In other words, in the case where the non-permeable type medium ME1 is selected as the medium ME0, when the test pattern TP2 is formed, it is desirable that the CL ink droplets DR2 be ejected into the second region AR2 in an amount that is 20% to 30% of the maximum amount of CL ink droplets DR2 that can be ejected to the second region AR2.

When the non-permeable type medium ME1 is selected as the medium ME0, the second recording density RD2 in the second region AR2 is higher than the third recording density RD3 for the permeable type medium ME2, under the presumption that the second recording density RD2 is lower than the first recording density RD1. By this, the pigment of the K ink droplets DR1 spreads and fixes on the surface of the non-permeable type medium ME1 and, as shown in FIG. 7, the vicinity of the region of the test pattern TP2 does not become light, and the coloring of the background image IM1 is stronger than the coloring of the region of the test pattern TP2. As shown in the lowermost part of FIG. 7, the read density D read by the reading section 60 is lower at the position of the test pattern TP2 and is higher the second region AR2 around the test pattern TP2.

Thus, the test pattern TP2 printed on the non-permeable type medium ME1 can be clearly read.

Figure 13:
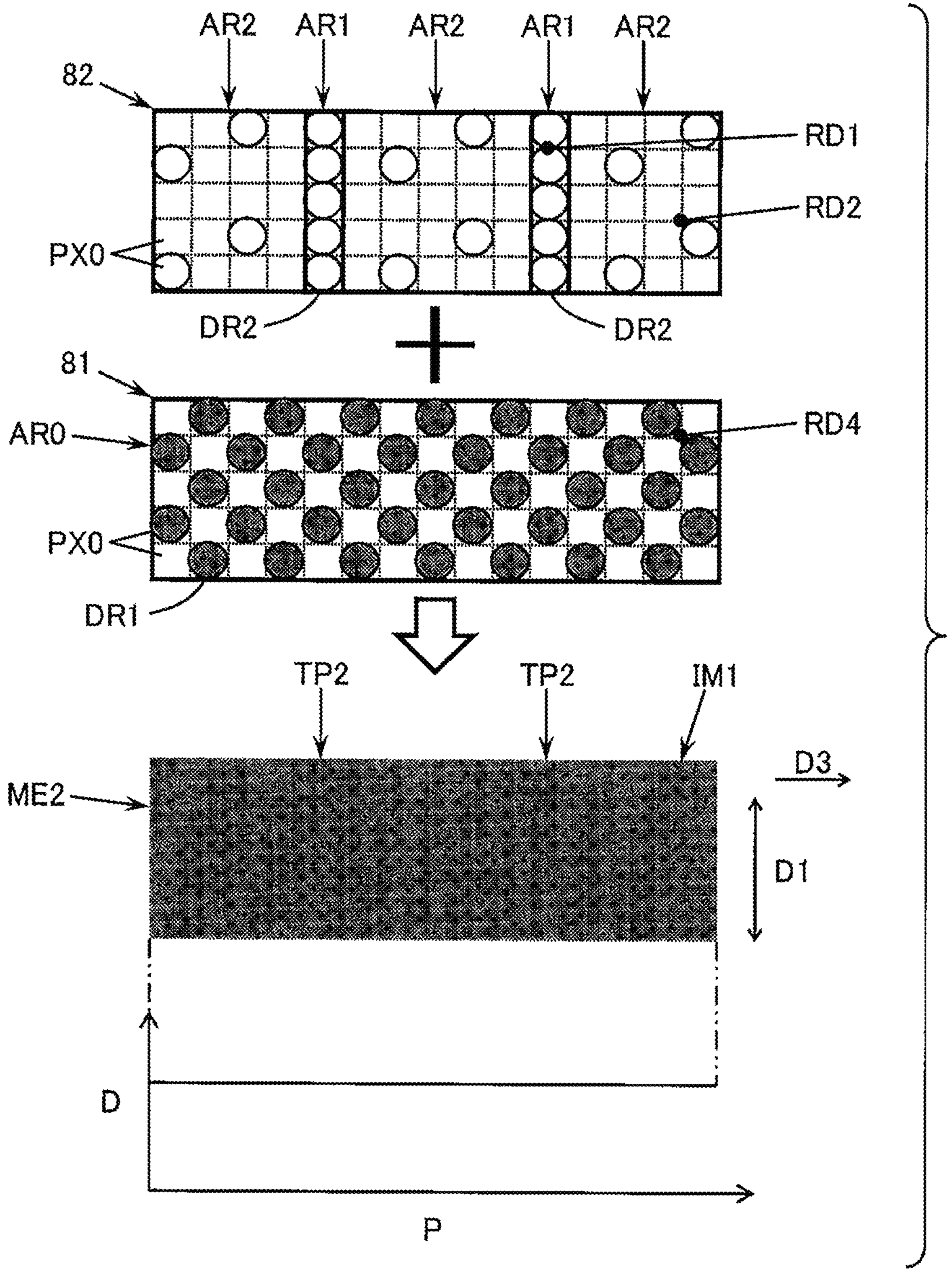
FIG. 13 is a diagram schematically showing a comparative example in which a test pattern of CL ink droplets is formed on a permeable type medium.

However, as illustrated in FIG. 13, when the medium ME0 is the permeable type medium ME2, even if the test pattern TP2 of the CL ink droplets DR2 is formed on the permeable type medium ME2 according to the ejection patterns 82 and 81 shown in FIG. 7, the test pattern TP2 cannot be clearly read. FIG. 13 schematically shows a comparative example in which the test pattern TP2 of the CL ink droplets DR2 is formed on the permeable type medium ME2 according to the ejection patterns 82 and 81. A test pattern TP2 and a background image IM1 on the permeable type medium ME2 are shown immediately below the ejection pattern 81. The lowest part of FIG. 13 shows the read density D corresponding to position P in the feed direction D3.

As illustrated in FIG. 13, the CL ink droplets DR2 having a recording density of about 20 to 30% have landed in the second region AR2, which does not correspond to the test pattern TP2, so the CL ink LQ2 permeated into the permeable type medium ME2. When the K ink droplets DR1 lands in the ejection range AR0, the pigment of the K ink droplets DR1 is caused to aggregate by the CL ink LQ2 and remains on the surface of the permeable type medium ME2, regardless of whether it is the first region AR1 or the second region AR2. Since the difference between the coloring of the test pattern TP2 and the coloring of the background image IM1 is slight, the difference between the first region AR1 and the second region AR2 in the read density D by the reading section 60 is small as shown in the lowermost portion of FIG. 13.

Thus, the test pattern TP2 cannot be clearly read.

Therefore, when forming the test pattern TP2, the control section U1 of this specific example performs control according to the ejection patterns 80 and 81 shown in FIG. 5 when the permeable type medium ME2 is selected as the medium ME0, and performs control according to the ejection patterns 82 and 81 shown in FIG. 7 when the non-permeable type medium ME1 is selected as the medium ME0. This makes it easier to read the test pattern TP2 of the CL ink droplets DR2, regardless of the type of the medium MEG.

The control section U1 shown in FIG. 1 can execute processing for specifying the non-permeable type medium ME1 and the permeable type medium ME2 as the medium ME0 on which printing is to be performed.

For example, when the host device HO1 transmits medium designation information capable of specifying the non-permeable type medium ME1 and the permeable type medium ME2 to the printer 2, the control section U1 can specify whether the medium ME0 is the non-permeable type medium ME1 or the permeable type medium ME2 based on the medium designation information. When the medium designation information indicates the type of the medium ME0, the control section U1 may specify whether the medium ME0 to be printed on is the non-permeable type medium ME1 or the permeable type medium ME2 according to the medium correspondence table TA1 illustrated in FIG. 8.

The medium correspondence table TA1 shown in FIG. 8 has information indicating the non-permeable type medium ME1 or the permeable type medium ME2 associated with medium designation information IN1 representing the type of the medium ME0. For example, the non-permeable type medium ME1 as the medium ME0 to be printed on is associated with film or coated paper as the types of medium ME0 represented by the medium designation information IN1. The permeable type medium ME2 as the medium ME0 to be printed on is associated with plain paper, wood-free paper, and textured paper as the types of the medium ME0 represented by the medium designation information IN1. When the medium designation information IN1 represents film or the like, the control section U1 can specify that the medium ME0 to be printed on is a non-permeable type medium ME1. When the medium designation information IN1 represents plain paper or the like, the control section U1 can specify that the medium ME0 to be printed on is a permeable type medium ME2.

The medium designation information may directly indicate whether the medium ME0 on which printing is performed is the non-permeable type medium ME1 or the permeable type medium ME2.

Also in the case when the operation panel 24 of the printer 2 receives input of the medium designation information, the control section U1 can specify whether the medium ME0 is the non-permeable type medium ME1 or the permeable type medium ME2 based on the medium designation information.

When the control section U1 includes the medium detection section U2 as shown in FIG. 1, the control section U1 may specify whether the medium ME0 is the non-permeable type medium ME1 or the permeable type medium ME2 based on the type of the medium ME0 detected by the medium detection section U2.

FIG. 9 schematically illustrates the control section U1 including the medium detection section U2.

The medium detection section U2 shown in FIG. 9 includes a light emitting section 71 for irradiating the medium ME0 with light Li, a light receiving section 72 for detecting a specular reflected component of the light Li from the medium ME0, and a light receiving section 73 for detecting the part of a diffuse reflected component of light Li from the medium ME0.+ Therefore, the medium detection section U2 can be said to be a reflective optical sensor. A light emitting diode or the like can be used for the light emitting section 71. Phototransistors or the like can be used for the light receiving sections 72 and 73. The light receiving section 72 outputs to the controller 10 an output value OUT1 corresponding to the detection intensity of incident specular reflected light. The light receiving section 73 outputs to the controller 10 an output value OUT2 corresponding to the detection intensity of incident diffuse reflected light.

Even if the intensity of the light Li is constant, the possible range of the output values OUT1 and OUT2 varies depending on the type of medium ME0. Therefore, if thresholds TH1, TH2, and so on for detecting the type of the medium ME0 are determined from the output values OUT1 and OUT2, the controller 10 can detect the type of the medium ME0 from the output values OUT1 and OUT2.

For example, the threshold TH1 corresponding to the lower limit of the output value OUT1, the threshold TH2 corresponding to the upper limit of the output value OUT1, the threshold TH3 corresponding to the lower limit of the output value OUT2, the threshold TH4 corresponding to the upper limit of the output value OUT2, the threshold TH5 corresponding to the lower limit of the ratio OUT2/OUT1 of the output values, and the threshold TH6 corresponding to the upper limit of the ratio OUT2/OUT1 of the output values can be defined as thresholds for detecting a film. When the medium ME0 is a film, the specular reflected component of light Li is large, and the diffuse reflected component of light Li is small. Therefore, the thresholds TH1 and TH2 are relatively large, the thresholds TH3 and TH4 are relatively small, and the thresholds TH5 and TH6 are relatively small. If $TH1 \leq OUT1 \leq TH2$, $TH3 \leq OUT2 \leq TH4$, and $TH5 \leq OUT2/OUT1 \leq TH6$ are satisfied, then the controller 10 can detect that the type of medium ME0 on which printing is to be performed is film.

When the type of the medium ME0 is plain paper, the thresholds TH1 and TH2 are smaller than those in the case of film, the thresholds TH3 and TH4 are larger than those in the case of film, and the thresholds TH5 and TH6 are larger than those in the case of film. As described above, the thresholds TH1 to TH6 vary depending on the type of the medium ME0. Therefore, by applying the thresholds TH1 to TH6 corresponding to the type of the medium ME0 to the output values OUT1 and OUT2, the type of the medium ME0 can be detected.

Note that the output values OUT1 and OUT2 may change according to the position of the medium ME0. Therefore, the medium detection section U2 may detect the reflected component of light Li at a plurality of positions of the medium ME0, and the controller 10 may detect the type of the medium ME0 by applying the thresholds TH1 to TH6 to the average value of the output values OUT1 and OUT2. By this, the type of the medium ME0 can be detected more accurately. Since the variance value and the standard deviation value of the output values OUT1 and OUT2 differ depending on the type of the medium ME0, a threshold value to be applied to the variance value and the standard deviation value of the output values OUT1 and OUT2 may also be defined. The type of the medium ME0 can be detected with higher accuracy by applying the above-described threshold value to the variance value or the standard deviation value of the output values OUT1 and OUT2.

(3) SPECIFIC EXAMPLE OF PROCESSES OF THE PRINTING DEVICE

Figure 10:
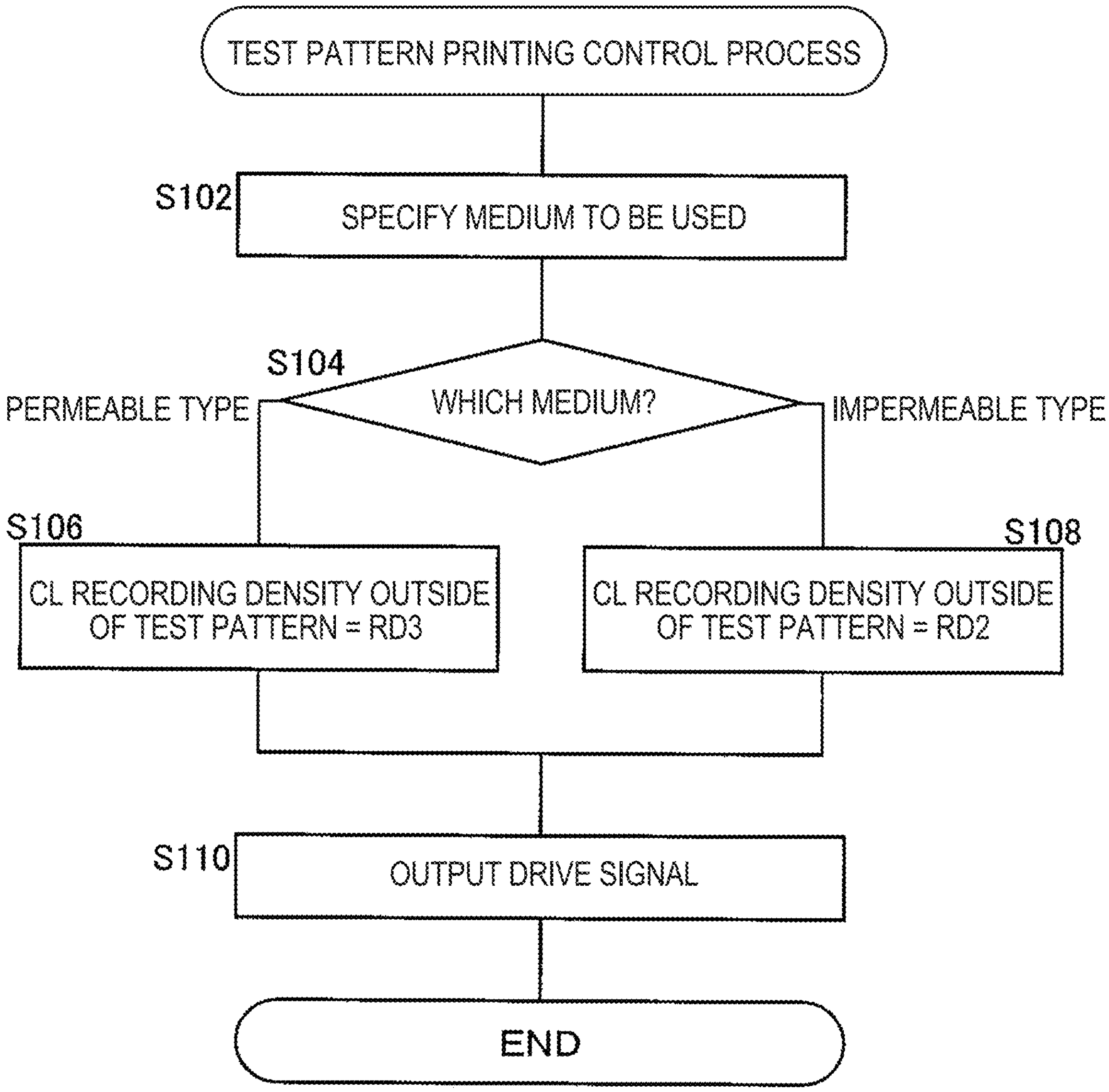
FIG. 10 is a flowchart schematically showing an example of the test pattern printing control process.

FIG. 10 schematically illustrates a test pattern printing control process for controlling printing of the test patterns TP1 and TP2 shown in FIGS. 4, 5, and 7. The test pattern printing control process includes the processes of steps S102 to S110. The controller 10 shown in FIG. 1 starts the test pattern printing control process when it receives a printing instruction for the test patterns TP1 and TP2 from the host device HO1 or the operation panel 24. Hereinafter, the word “step” may be omitted, and reference numerals of steps may be indicated in parentheses.

When the test pattern printing control process starts, the controller 10 performs a medium specifying process for specifying whether the medium ME0 on which printing is to be performed is a non-permeable type medium ME1 or a permeable type medium ME2 (S102).

For example, when the transmission I/F 22 receives the medium designation information from the host device HO1, in S102 the controller 10 specifies whether the medium ME0 is a non-permeable type medium ME1 or a permeable type medium ME2 based on the medium designation information from the host device HO1. Referring to FIG. 8, for example, when the medium designation information IN1 represents film or coated paper, then, in accordance with the medium correspondence table TA1, the controller 10 specifies the non-permeable type medium ME1, which is associated with the medium designation information IN1, as the medium ME0 to be printed on. When the medium designation information IN1 represents plain paper, wood-free paper, or textured paper, then, in accordance with the medium correspondence table TA1, the controller 10 specifies the permeable type medium ME2, which is associated with the medium designation information IN1, as the medium ME0 to be printed on. When the operation panel 24 receives the input of the medium designation information IN1, the medium ME0 to be printed can be specified in the same manner.

When the medium detection section U2 shown in FIG. 9 detects the reflected component of light Li, then in S102 the controller 10 acquires the output values OUT1 and OUT2 from the medium detection section U2, and detects the type of the medium ME0 from these output values OUT1 and OUT2. For example, when the thresholds TH1 to TH6 for detecting a film and the output values OUT1 and OUT2 satisfy the relationship of TH1 OUT1 TH2, TH3 OUT2 TH4, and TH5 OUT2/OUT1 TH6, then the controller 10 detects that the type of the medium ME0 is a film. In this case, the controller 10 specifies non-permeable type medium ME1 as the medium ME0 to be printed in accordance with the medium correspondence table TA1. With respect to other types of medium ME0, the controller 10 detects the type of medium ME0 in the same manner, and specifies whether the medium ME0 to be printed is the non-permeable type medium ME1 or the permeable type medium ME2.

After the medium specifying process, the controller 10 branches to a process depending on whether the medium ME0 on which printing is performed is the permeable type medium ME2 or the non-permeable type medium ME1 (S104). When the medium ME0 is a permeable type medium ME2, the controller 10 sets the recording density of the CL ink droplets DR2 in the second region AR2, which does not correspond to the test pattern TP2, to the third recording density RD3 as shown in FIG. 5 (S106). When the medium ME0 is a non-permeable type medium ME1, the controller 10 sets the recording density of the CL ink droplets DR2 in the second region AR2, which does not correspond to the test pattern TP2, to the second recording density RD2 as shown in FIG. 7 (S108). As described above, the second recording density RD2 is higher than the third recording density RD3 and lower than the first recording density RD1.

After the process of S106 or S108, the controller 10 outputs, to the print head 30, the drive signal SG1 for forming the test patterns TP1 and TP2 on the medium ME0 (S110), and terminates the test pattern printing control process. As for the test pattern TP2 of the CL ink droplets DR2, the drive signal SG1 corresponding to the ejection patterns 80 and 81 shown in FIG. 5 or the ejection patterns 82 and 81 shown in FIG. 7 is output to the print heads 30CL and 30K. For the test pattern TP1 of the K ink droplets DR1, the drive signal SG1 corresponding to the ejection pattern of the test pattern TP1 shown in FIG. 4 is output to the print head 30K.

The formation of the test pattern TP2 of the CL ink droplets DR2 is controlled as follows.

First, the controller 10 controls the ejection of the CL ink droplets DR2 from the CL nozzles NZ2 so as to obtain the ejection pattern 80 of FIG. 5 when the medium ME0 is the permeable type medium ME2 and so as to obtain the ejection pattern 82 of FIG. 7 when the medium ME0 is the non-permeable type medium ME1. In the ejection pattern 80 shown in FIG. 5, the recording density of the CL ink droplets DR2 in the first region AR1, which corresponds to the test pattern TP2, is the first recording density RD1, and the recording density of the CL ink droplets DR2 in the second region AR2 is the third recording density RD3. In the ejection pattern 82 shown in FIG. 7, the recording density of the CL ink droplets DR2 in the first region AR1 is the first recording density RD1 and the recording density of the CL ink droplets DR2 in the second region AR2 is the second recording density RD2. As described above, the first recording density RD1 is, for example, 100%, the third recording density RD3 is, for example, 0%, and $RD3<RD2<RD1$. Here, since the third recording density RD3 includes 0%, the range of the second recording density RD2 can also be expressed as $0\%<RD2<RD1$. The controller 10 controls the ejection of the CL ink droplets DR2 from the CL nozzles NZ2, whereby the second droplet ejection step Sa for ejecting the CL ink droplets DR2 from the CL nozzles NZ2 is performed.

When the printer 2 is provided with the medium detection section U2, the controller 10 selects the ejection pattern 80 of FIG. 5 or the ejection pattern 82 of FIG. 7 according to the type of the medium ME0 detected by the medium detection section U2. When the type of the medium ME0 detected by the medium detection section U2 corresponds to the permeable type medium ME2, the controller 10 controls ejection of CL ink droplets DR2 from the CL nozzles NZ2 so that the recording density of the CL ink droplets DR2 in the second region AR2 becomes the third recording density RD3. When the type of the medium ME0 detected by the medium detection section U2 corresponds to the non-permeable type medium ME1, ejection of the CL ink droplets DR2 from the CL nozzles NZ2 is controlled so that the recording density of the CL ink droplets DR2 in the second region AR2 becomes the second recording density RD2.

Next, the controller 10 controls ejection of the K ink droplets DR1 from the K nozzles NZ1 so as to obtain the ejection pattern 81 shown in FIGS. 5 and 7. The recording density of the K ink droplets DR1 in the ejection pattern 81 is the K ink recording density RD4, which is larger than the third recording density RD3 of the CL ink droplets DR2 and smaller than the first recording density RD1 of the CL ink droplets DR2 and is, for example, 40 to 60%. The controller 10 controls the ejection of the K ink droplets DR1 from the K nozzles NZ1, thereby performing the first droplet ejection step Sb of ejecting the K ink droplets DR1 from the K nozzles NZ1 to the ejection range AR0.

In the case where the medium ME0 is the permeable type medium ME2, when the CL ink droplets DR2 land in the first region AR1, which corresponds to the test pattern TP2, they permeate into the permeable type medium ME2 as the CL ink LQ2 as shown in FIG. 3. After that, when the K ink droplets DR1 land on the first region AR1, the pigment of the K ink droplets DR1 stays on the surface of the first region AR1, and dense second dots DT2 are formed in the first region AR1. In the second region AR2, since the recording density of the CL ink droplets DR2 is low, the pigment of the K ink droplets DR1 permeates into the inside of the permeable type medium ME2. As shown in FIG. 5, since the coloring of the background image IM1 is weaker than the coloring of the first region AR1, the test pattern TP2 can be clearly read.

In the case where the medium ME0 is the non-permeable type medium ME1, even if the CL ink droplets DR2 land, they stay on the surface of the non-permeable type medium ME1 as shown in FIG. 6. In the first region AR1, which corresponds to the test pattern TP2, the recording density of the CL ink droplets DR2 is high toward the surface of the non-permeable type medium ME1. When the K ink droplets DR1 land in the first region AR1, the pigment of the K ink droplets DR1 is immediately aggregated by the CL ink LQ2 remaining on the surface of the non-permeable type medium ME1, and a small second dot DT2 is formed in the first region AR1. Since the second dot DT2 is small, the coloring of the test pattern TP2 is light. In the second region AR2, RD3<RD2<RD1, that is, 0%<RD, and by the CL ink droplets DR2 being ejected to the second region AR2, the pigments of the K ink droplets DR1 spread and become fixed on the surface of the non-permeable type medium ME1. As shown in FIG. 7, the region in the vicinity of the test pattern TP2 is less likely to be light, and the coloring of the background image IM1 is stronger than the coloring of the region of the test pattern TP2, so that the test pattern TP2 can be clearly read.

By the above, the test pattern TP2 of the CL ink droplets DR2 can be easily read regardless of the type of the medium ME0.

As shown in FIG. 4, the controller 10 also controls the formation of the test pattern TP1 of the K ink droplets DR1 in addition to the formation of the test pattern TP2 of the CL ink droplets DR2. By this, K ink droplets DR1 are ejected from the K nozzles NZ1 so as to form the test pattern TP1. When the reading section 60 reads the test patterns TP1 and TP2, the controller 10 can acquire information indicating the positions of the test patterns TP1 and TP2 in the feed direction D3 from the read result. Therefore, based on the positions of the test patterns TP1 and TP2 in the feed direction D3, the controller 10 can align the ejection timing of the K ink droplets DR1 and the ejection timing of the CL ink droplets DR2 so that the landing positions of the K ink droplets DR1 and the landing positions of the CL ink droplets DR2 in the feed direction D3 match each other.

In this way, inter-nozzle array adjustment between the nozzle array 33 of the print head 30K and the nozzle array 33 of the print head 30CL is performed. Therefore, even if the print head 30CL is separate from the other print heads 30, the landing positions of the CL ink droplets DR2 can be aligned with the landing positions of the colored ink droplets in the feed direction D3. Note that when the above-described inter-nozzle array adjustment is not performed, it is necessary to eject the CL ink droplets DR2 in an ejection range obtained by adding a wide margin to the landing range of the colored ink droplets. By performing the above-described inter-nozzle adjustment, the above-described margin can be reduced, and the amount of the CL ink LQ2 used can be reduced.

As described above, the printing device 1 of this specific example can make the test pattern TP2 of the second droplet, which changes the coloring by the color component of the first droplet, easily readable regardless of the type of the medium MEG.

(4) MODIFICATIONS

Various modifications of the present disclosure are conceivable.

For example, the printer 2 is not limited to a line type printer, but may be a serial type printer or the like in which the print head 30 is moved relatively in the forward and backward directions, which intersect the feed direction D3.

That which performs the above-described processes are not limited to a CPU, and may be an electronic component other than a CPU, such as an ASIC. Of course, a plurality of CPUs may cooperate to perform the above-described processes, or a CPU and another electronic component (for example, an ASIC) may cooperate to perform the above-described processes.

A part of the processes described above may be performed by the host device HO1. In this case, the combination of the controller 10 and the host device HO1 serves as an example of the control section U1, and the combination of the printer 2 and the host device HO1 serves as an example of the printing device 1.

The combinations of liquid colors other than the CL ink are not limited to C, M, Y, and K, and may include orange, green, light cyan with a concentration lower than C, light magenta with a concentration lower than M, dark yellow with a concentration higher than Y, light black with a concentration lower than K, and the like. Of course, the present technology can be applied to a case where the printing device 1 does not use any of the C, M, Y, and K liquids.

The first droplets ejected to the ejection range AR0, which includes the test pattern TP2, are desirably K liquid droplets, which result in a large difference in density between the test pattern TP2 and the background image IM1, but may be a C liquid droplet, an M liquid droplet, a Y liquid droplet, or the like. Therefore, the first nozzle for ejecting the first droplets in the ejection range AR0 is not limited to a K nozzle, but may be a C nozzle for ejecting C droplets, an M nozzle for ejecting M droplets, a Y nozzle for ejecting Y droplets, or the like.

When depositing a first droplet such as a K ink droplet DR1 in the ejection range AR0, the printer 2 may deposit the first droplet such that, immediately after the first droplet lands, the second droplet such as the CL ink droplet DR2 overlaps with the first droplet.

The first recording density RD1 of the CL ink droplets DR2 in the first region AR1, which corresponds to the test pattern TP2, is not limited to 100%, and may be lower than 100% in a range higher than the second recording density RD2, such as 99%.

In the case where the medium ME0 is the permeable type medium ME2, the third recording density RD3 of the CL ink droplets DR2 in the second region AR2 is not limited to 0%, and may be higher than 0% in a range lower than the second recording density RD2, such as 1%.

The test pattern TP2 for acquiring the landing position of the second droplet from the second nozzle such as the CL nozzle is not limited to the inter-nozzle array adjustment pattern, and may be a reciprocation adjustment pattern for adjusting the landing position of the CL ink droplets DR2 between movement in the forward direction and the movement in the backward direction.

The test pattern TP2 may be a nozzle test pattern for acquiring the landing state of the second droplet from the second nozzle.

Figure 11:
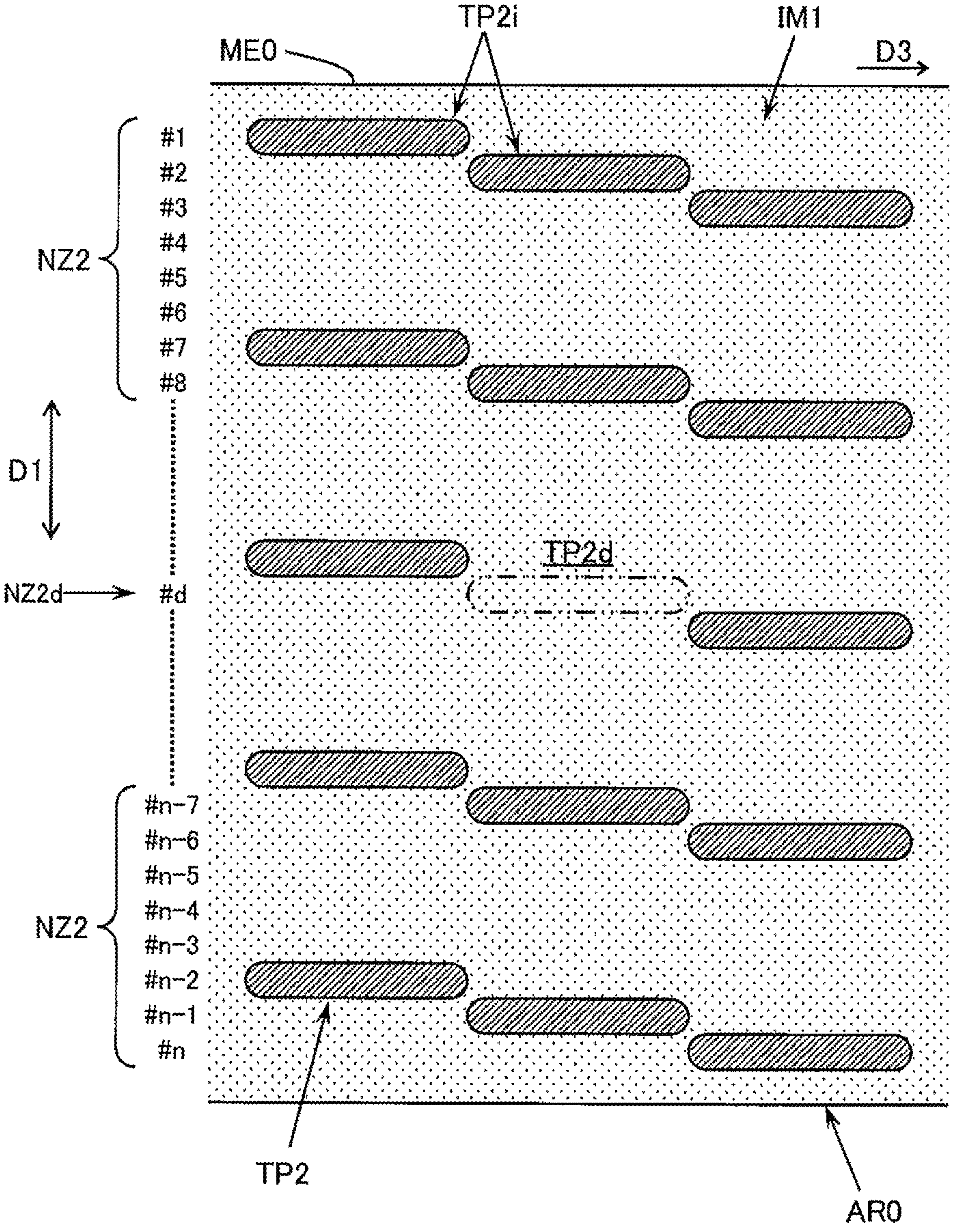
FIG. 11 is a diagram schematically showing an example of a test pattern for acquiring the landing state of second droplets from the second nozzles.

FIG. 11 schematically illustrates a test pattern TP2 for acquiring the landing state of CL ink droplets DR2 from CL nozzles NZ2. For convenience, the n CL nozzles NZ2 located at different positions in the width direction D1, which intersects the feed direction D3 of the medium ME0, are identified as #1, #2, . . . , #n−1, and #n, in this order.

The test pattern TP2 shown in FIG. 11 includes individual patterns TP2*i* corresponding to positions of CL nozzles NZ2 in the width direction D1. The ejection range AR0 of the K ink droplets DR1 includes the individual patterns TP2*i* and the background image IM1. The individual patterns TP2*i* and the background image IM1 are printed when the print job is changed or when the lot of the medium ME0 is changed. Each individual pattern TP2*i* is a linear pattern in which dots are connected in the feed direction D3. In order to clearly show the correspondence relationship between the individual patterns TP2*i* and the CL nozzles #1 to #n in the width direction D1, the individual patterns TP2*i* corresponding to CL nozzles NZ2 that are adjacent in the width direction D1 are located at positions shifted in the feed direction D3. In the example shown in FIG. 11, the plurality of CL nozzles NZ2 are evenly divided into six groups, and the individual patterns TP2*i* are arranged so that the positions of the groups in the feed direction D3 do not overlap each other.

Here, it is assumed that, of the CL nozzles #1 to #n, the CL nozzle #d is a defective nozzle NZ2*d* having an ejection failure, and the remaining CL nozzles are normal nozzles that eject normally. Since CL ink droplets DR2 are ejected normally from the normal nozzles, the individual patterns TP2*i* corresponding to the normal nozzles are formed on the medium ME0. On the other hand, since the CL ink droplets DR2 are not ejected normally from the defective nozzle NZ2*d*, the individual pattern TP2*i* corresponding to the defective nozzle NZ2*d* is not formed normally. In FIG. 11, a section of the medium ME0 corresponding to the defective nozzle NZ2*d* is shown as a missing pattern TP2*d*. The user can grasp the position and the number of the defective nozzle NZ2*d* included in the CL nozzles #1 to #n by visually confirming the missing pattern TP2*d* in the test pattern TP2. Of course, the reading section 60 may read the individual patterns TP2*i*, and the controller 10 may determine the position and the number of the defective nozzle NZ2*d* based on the reading result by the reading section 60.

As described above, in the example shown in FIG. 11, the test pattern TP2 for acquiring the landing state of the CL ink droplets DR2 from the CL nozzles NZ2 can be easily read regardless of the type of the medium ME0.

(5) CONCLUSIONS

As described above, according to various aspects of the present disclosure, it is possible to provide, for example, technology for making it easy to read a test pattern of droplets that change coloring by a color component, regardless of the type of medium. Of course, the above-described basic operations and effects can be obtained even with a technology consisting only of the constituent elements according to the independent claims.

A configuration in which the respective configurations disclosed in the above-mentioned examples are replaced with each other or combinations thereof are changed, a configuration in which the respective configurations disclosed in the publicly known art and the above-mentioned examples are replaced with each other or combinations thereof are changed, and the like can be implemented. The present disclosure also includes these configurations.

What is claimed is:

1. A printing device for printing on a medium selected from a plurality of mediums including a first medium and a second medium into which droplets permeate more easily than into the first medium, the printing device comprising:

a print head having a plurality of nozzles including a first nozzle configured to eject, onto the medium, first droplets containing a color component and a second nozzle configured to eject, onto the medium, second droplets that change the coloring by the color component; and a control section that controls ejection of the first droplets and of the second droplets from the print head, wherein the control section is configured to execute control for forming, on the medium, a test pattern for acquiring at least one of a landing position and a landing state of the second droplets from the second nozzle, the test pattern being included in an ejection range of the first droplets, when causing to form the test pattern, control ejection of second droplets from the second nozzle so that a recording density of second droplets in a first region corresponding to the test pattern becomes a first recording density and so that a recording density of second droplets ejected onto the first medium in a second region of the ejection range, the second region excluding the first region, becomes a second recording density that is higher than 0% and that is lower than the first recording density, and when causing to form the test pattern on the second medium, control ejection of the second droplets from the second nozzle so that the recording density of second droplets ejected onto the second medium in the second region of the ejection range becomes a third recording density that is lower than the second recording density.

2. The printing device according to claim 1, wherein the control section controls ejection of second droplets from the second nozzle so that when causing first droplets to land in the first region, the first droplets land, after the second droplets land, on the second droplets in an overlapping manner.

3. The printing device of claim 1, wherein the control section includes a medium detection section that detects a type of the medium on which the printing is to be performed, controls ejection of the second droplets from the second nozzle so that, when the type of medium detected by the medium detection section corresponds to the first medium, a recording density of the second droplets in the second region becomes the second recording density, and controls ejection of the second droplets from the second nozzle so that, when the type of medium detected by the medium detection section corresponds to the second medium, a recording density of the second droplets in the second region becomes the third recording density.

4. The printing device according to claim 1, wherein the first droplets for forming the test pattern are black droplets.

5. The printing device according to claim 1, wherein when causing the test pattern to be formed, the control section controls ejection of the first droplets from the first nozzle so that the first droplets are ejected to the ejection range in an amount of 40% to 60% of a maximum amount of first droplets ejectable into the ejection range.

* * * * *